US011678316B2

(12) United States Patent
Zuckerman et al.

(10) Patent No.: US 11,678,316 B2
(45) Date of Patent: Jun. 13, 2023

(54) SYNCHRONIZING WIRELESS TRANSMISSIONS BETWEEN A BASE STATION AND A PLURALITY OF WIRELESS CLIENT DEVICES USING A PLURALITY OF TWISTED PAIRS

(71) Applicant: Cellium Technologies, Ltd., Tel Aviv (IL)

(72) Inventors: Gal Zuckerman, Holon (IL); Oz Liv, Tel Aviv (IL); Roy Kinamon, Tel Aviv (IL)

(73) Assignee: Cellium Technologies, Ltd., Tel Aviv (IL)

( * ) Notice: Subject to any disclaimer, the term of this patent is extended or adjusted under 35 U.S.C. 154(b) by 0 days.

(21) Appl. No.: 17/572,119

(22) Filed: Jan. 10, 2022

(65) Prior Publication Data

US 2022/0132505 A1    Apr. 28, 2022

Related U.S. Application Data

(63) Continuation of application No. 17/409,182, filed on Aug. 23, 2021, which is a continuation of application
(Continued)

(51) Int. Cl.
*H04W 72/0453* (2023.01)
*H04L 27/26* (2006.01)
(Continued)

(52) U.S. Cl.
CPC ..... *H04W 72/0453* (2013.01); *H04L 27/2601* (2013.01); *H04W 16/02* (2013.01);
(Continued)

(58) Field of Classification Search
CPC . H04W 72/0453; H04W 16/02; H04W 16/06; H04W 56/002; H04W 72/0406;
(Continued)

(56) References Cited

U.S. PATENT DOCUMENTS

| 5,809,395 A | 9/1998 | Hamilton-Piercy et al. |
| 5,867,763 A | 3/1999 | Dean et al. |

(Continued)

FOREIGN PATENT DOCUMENTS

WO    WO-2004045125 A2 *  5/2004    ............ H04W 16/26

OTHER PUBLICATIONS

S. Lipoff, "Personal Communications Services and Cable TV", 1992, pp. 22-25, IEEE.
(Continued)

*Primary Examiner* — Rina C Pancholi
(74) *Attorney, Agent, or Firm* — Intrinsic Law Corp.

(57) ABSTRACT

A system operative to synchronize wireless transmissions between a base station and a plurality of wireless client devices using a plurality of twisted pairs. The system includes a base station located in a first area and comprising a medium access controller (MAC) functionality; a plurality of twisted pairs; and a plurality of converters located in other areas, in which the plurality of twisted pairs are operative to connect the base station with the plurality of converters, thereby forming a star topology. The base station is configured to determine a transmission plan to be followed by the base station and a plurality of wireless client devices associated with the base station. The base station is configured to distribute the transmission plan via the plurality of twisted pairs and converters to the wireless client devices, thereby synchronizing wireless transmissions between the base station and at least some of the wireless client devices.

20 Claims, 33 Drawing Sheets

Related U.S. Application Data

No. 16/875,588, filed on May 15, 2020, now Pat. No. 11,350,412, which is a continuation of application No. 15/588,729, filed on May 8, 2017, now Pat. No. 10,716,109, which is a continuation of application No. 14/837,021, filed on Aug. 27, 2015, now Pat. No. 9,648,594, which is a continuation of application No. 14/199,009, filed on Mar. 6, 2014, now Pat. No. 9,125,190, which is a continuation of application No. 13/217,572, filed on Aug. 25, 2011, now Pat. No. 8,699,437, which is a continuation of application No. 11/603,178, filed on Nov. 22, 2006, now Pat. No. 8,027,299.

(60) Provisional application No. 60/739,429, filed on Nov. 25, 2005.

(51) Int. Cl.

| | | |
|---|---|---|
| *H04W 16/02* | (2009.01) | |
| *H04W 72/20* | (2023.01) | |
| *H04W 92/02* | (2009.01) | |
| *H04W 16/06* | (2009.01) | |
| *H04W 56/00* | (2009.01) | |
| *H04L 5/00* | (2006.01) | |
| *H04W 84/12* | (2009.01) | |

(52) U.S. Cl.
CPC ......... *H04W 16/06* (2013.01); *H04W 56/002* (2013.01); *H04W 72/20* (2023.01); *H04W 92/02* (2013.01); *H04L 5/0007* (2013.01); *H04L 5/0023* (2013.01); *H04W 84/12* (2013.01)

(58) Field of Classification Search
CPC .. H04W 92/02; H04W 84/12; H04L 27/2601; H04L 5/0007; H04L 5/0023
See application file for complete search history.

(56) References Cited

U.S. PATENT DOCUMENTS

| | | |
|---|---|---|
| 6,005,884 A | 12/1999 | Cook et al. |
| 6,594,827 B1 | 7/2003 | Pennings |
| 6,665,279 B1 | 12/2003 | Kwak et al. |
| 6,967,943 B1 | 11/2005 | Hämäläinen et al. |
| 7,002,934 B2 | 1/2006 | Dolgonos et al. |
| 7,813,738 B2 | 10/2010 | Shpak |
| 9,179,495 B1 | 11/2015 | Scherzer et al. |
| 2002/0048071 A1 | 4/2002 | Suzuki et al. |
| 2002/0137464 A1 | 9/2002 | Dolgonos et al. |
| 2002/0145988 A1 | 10/2002 | Dahlman et al. |
| 2002/0147978 A1 | 10/2002 | Dolgonos et al. |
| 2003/0072055 A1 | 4/2003 | Mickelsson et al. |
| 2003/0138029 A1 | 7/2003 | Gerard |
| 2003/0161637 A1 | 8/2003 | Yamamoto et al. |
| 2004/0053602 A1 | 3/2004 | Wurzburg |
| 2004/0166869 A1 | 8/2004 | Laroia et al. |
| 2004/0264683 A1 | 12/2004 | Bye |
| 2005/0013379 A1 | 1/2005 | Duvaut et al. |
| 2005/0232223 A1 | 10/2005 | Muller |
| 2006/0182076 A1 | 8/2006 | Wang |
| 2006/0270431 A1 | 11/2006 | Yoshi |
| 2007/0002796 A1 | 1/2007 | Horn et al. |
| 2007/0070959 A1 | 3/2007 | Almeroth et al. |
| 2007/0077968 A1 | 4/2007 | Kuzminskiy |
| 2007/0121546 A1* | 5/2007 | Zuckerman ............. H04L 5/023 370/329 |
| 2007/0121743 A1* | 5/2007 | Zuckerman ......... H04L 27/2601 375/260 |
| 2007/0121744 A1* | 5/2007 | Zuckerman ......... H04L 27/2601 375/260 |
| 2007/0121745 A1* | 5/2007 | Zuckerman ............. H04L 5/023 375/260 |
| 2007/0155323 A1 | 7/2007 | Matsumoto et al. |
| 2008/0025287 A1* | 1/2008 | Whittaker ............. H04L 7/0008 370/347 |
| 2008/0186881 A1 | 8/2008 | Ahl et al. |

OTHER PUBLICATIONS

R.W. Donaldson et al., "Wireless CATV Network Access for Personal Communications Using Simulcasting", IEEE Transactions on Vehicular Technology, Aug. 1994, pp. 666-671, vol. 43, No. 3, IEEE.

A.S Beasley, "The Advantages of Using Cable TV Distribution Plant for Linking PCS-Microcells", 1992, pp. 292-295, IEEE.

* cited by examiner

FIG. 4A - PRIOR ART

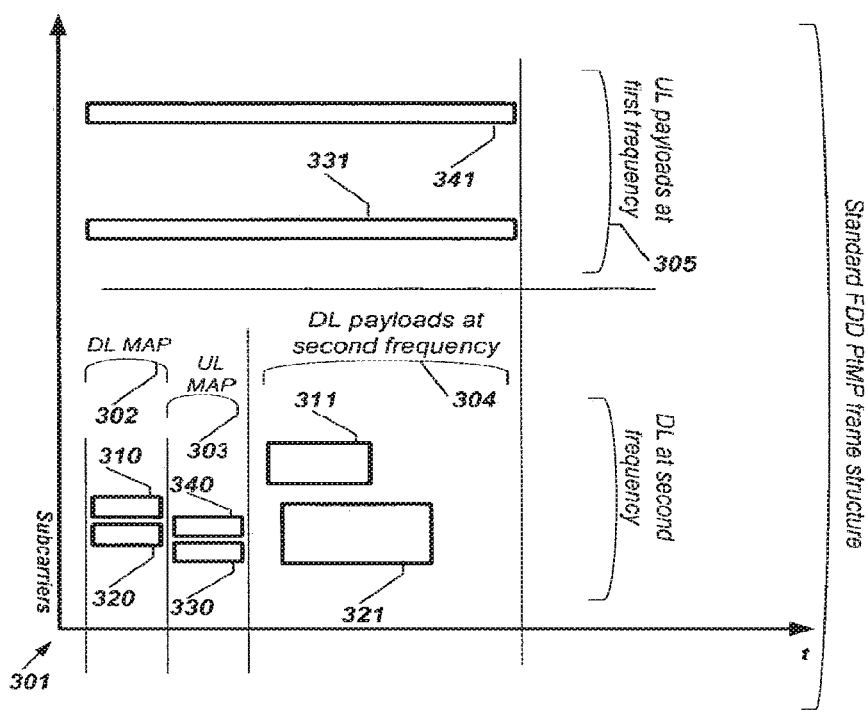
FIG. 4C - PRIOR ART

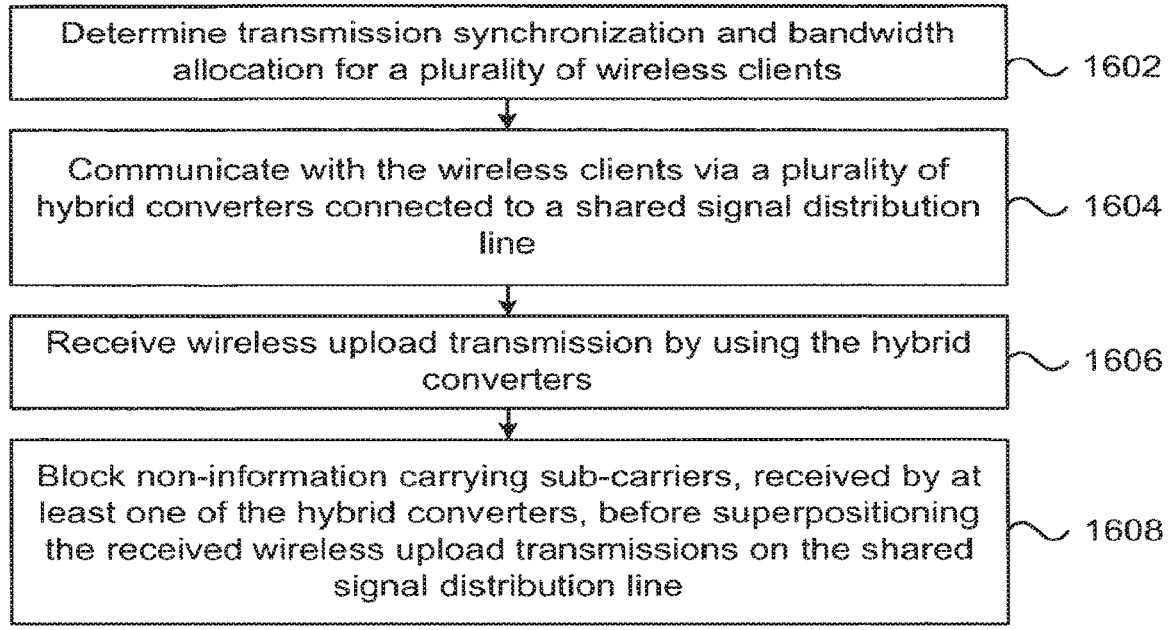
FIG. 16A
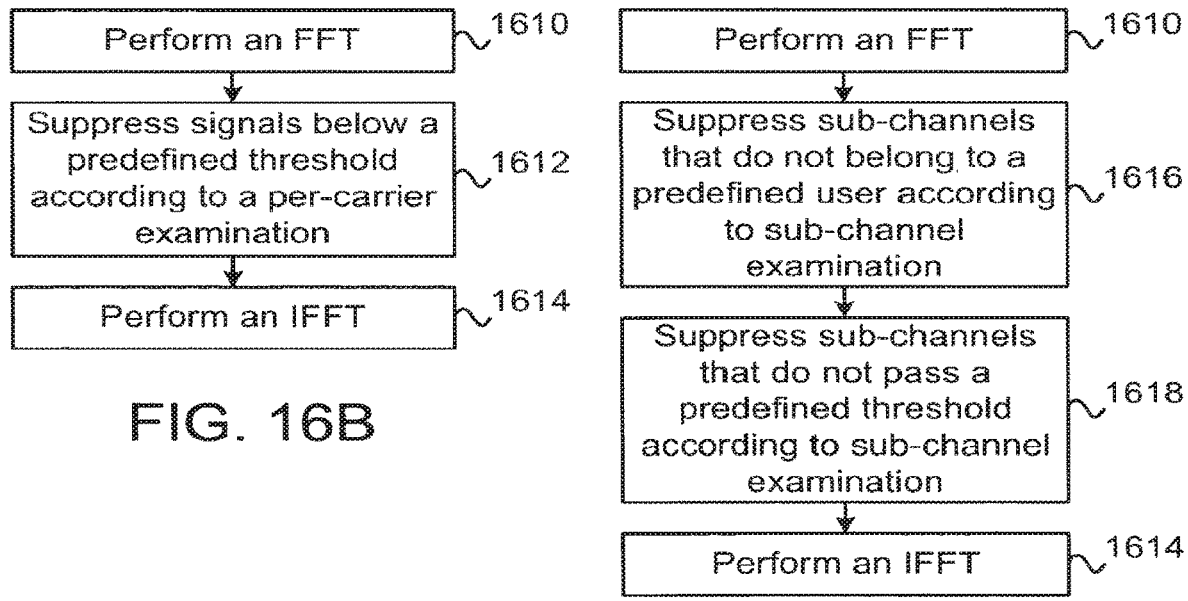
FIG. 16B
FIG. 16C

SYNCHRONIZING WIRELESS TRANSMISSIONS BETWEEN A BASE STATION AND A PLURALITY OF WIRELESS CLIENT DEVICES USING A PLURALITY OF TWISTED PAIRS

CROSS-REFERENCE TO RELATED APPLICATIONS

This application is a continuation of U.S. patent application Ser. No. 17/409,182 filed on Aug. 23, 2021, which is a continuation of U.S. patent application Ser. No. 16/875,588 filed on May 15, 2020, which is a continuation of U.S. patent application Ser. No. 15/588,729, filed on May 8, 2017, now U.S. Pat. No. 10,716,109, which is a continuation of U.S. patent application Ser. No. 14/837,021, filed on Aug. 27, 2015, now U.S. Pat. No. 9,648,594, which is a continuation of U.S. patent application Ser. No. 14/199,009, filed on Mar. 6, 2014, now U.S. Pat. No. 9,125,190, which is a continuation of U.S. patent application Ser. No. 13/217,572, filed on Aug. 25, 2011, now U.S. Pat. No. 8,699,437, which is a continuation of U.S. patent application Ser. No. 11/603,178, filed on Nov. 22, 2006, now U.S. Pat. No. 8,027,299, which claims priority to U.S. Provisional Patent Application Ser. No. 60/739,429, filed on Nov. 25, 2005. Each of the aforementioned applications is hereby incorporated by reference in its entirety.

BACKGROUND

The embodiments of the present invention relate to communication systems and, more particularly, to methods and corresponding systems for hybrid wired-wireless and wireless-wireless, point-to-multipoint communication, featuring a shared channel, discrete multi-tone modulation, and wireless transmission.

Basic principles and details relating to hybrid wired-wireless point-to-multipoint communication systems needed for properly understanding the embodiments of the present invention are provided herein. Complete theoretical descriptions, details, explanations, examples, and applications of these and related subjects and phenomena are readily available in standard references in the fields of digital telecommunication.

Known wireless modems take information from customer modems (Cable/CATV modem, xDSL modem or PON modem) and remodulate it in the air between the wire's endpoint and various wireless devices. These wireless technologies may vary and include technologies such as WiFi, WiMAX, BlueTooth, ZigBee and UWB.

Cable modems mostly use the DOCSIS standards for transferring data in parallel with dedicated CATV channels, which transfer the video channels over coax cables. Various modulations can be used to carry the data over the coax, while the most common modulation used today over Coax is single carrier. In xDSL modems a similar approach is used for carrying data over twisted pairs used by the PSTN infrastructure. The most common modulation used in xDSL is DMT/OFDM, even though single carrier QAM modulations are used as well in certain standards.

Some embodiments of the invention feature multi-carrier modulation. Multi-carrier modulation systems generally involve a data signal made of successive symbols, split into several lower rate signals, each associated with a sub-carrier and resulting in a long symbol time in comparison to the expected multipath delay spread. Orthogonal frequency division modulation (OFDM) is a multi-carrier modulation scheme, which maps data symbols onto N orthogonal subcarriers, separated by a distance of 1/T, and where T is the useful symbol duration. In OFDM, cyclic guard intervals are frequently used to improve performance in the presence of a multipath channel. OFDM has become attractive for wireless communications due to its high spectral efficiency and resistance to noise and multipath effects. OFDM has been the foundation of a number of wireless broadcast standards, some of them providing for Single Frequency Network (SFN) operation, in which a number of transmitters operate in simulcast manner.

OFDMA is the "multi-user" version of OFDM. Each OFDMA user transmits symbols using subcarriers that remain orthogonal to those of other users.

The orthogonal frequency division multiple access (OFDMA) system, a multiple access system designed for simultaneous access by multiple users, is applied to OFDM. OFDMA divides an allocated frequency band into N subcarriers and allocates them to groups, for simultaneous use by multiple links. Supporting high rate applications, multiple subcarriers may be assigned to a single user. On the forward link from a base station to a plurality of users, the subcarrier groups, allocated to the respective mobile stations, are transferred simultaneously, while at the same time synchronizing with one another, and thereby guaranteeing mutual orthogonality of the subcarriers.

BRIEF SUMMARY

The disclosed embodiments may be readily implemented using standard hardware. Moreover, the system of the present invention may be applicable as a centralized system or a decentralized system.

Implementation of the method and corresponding system of the present invention involves performing or completing selected tasks or steps manually, semi-automatically, fully automatically, and/or, a combination thereof. Moreover, according to actual instrumentation and/or equipment used for implementing a particular embodiment of the disclosed method and corresponding system, several selected steps of the embodiments of the present invention could be performed by hardware, by software running on any operating system of any firmware, or a combination thereof. In particular, as hardware, selected steps of the invention could be performed by a computerized network, a computer, a computer chip, an electronic circuit, hard-wired circuitry, or a combination thereof, involving a plurality of digital and/or analog, electrical and/or electronic, components, operations, and protocols. Additionally, or alternatively, as software, selected steps of the invention may be performed by a data processor, such as a computing platform, executing a plurality of computer program types of software instructions or protocols using any suitable computer operating system.

It is to be understood that the scope of the present invention is not limited in its application by details relating to the order or sequence of steps of operation, or implementation of the method; furthermore, its application/use is not limited by details relating to construction, arrangement, and, composition of the components of the device, all of which are set forth in the following description, drawings, or examples. While specific steps, configurations and arrangements are discussed, it is to be understood that this is for illustrative purposes only. A person skilled in the relevant art will recognize that other steps, configurations and arrangements can be used without departing from the spirit and scope of the present invention.

The present invention is capable of having further embodiments or of being practiced, or carried out, in other various ways. Also, it is to be understood that the phraseology, terminology, and, notations found herein are for the purpose of description and should not be regarded as limiting the scope of the present invention.

In the following description of the method of the present invention, included are only main or principal steps needed for sufficiently understanding proper 'enabling' utilization and implementation of the disclosed methods and corresponding systems. Accordingly, descriptions of the various required or optional minor, intermediate, and/or, sub steps, which are readily known by one of ordinary skill in the art, and/or, which are available in the prior art and technical literature relating to digital communication, are not included herein.

The present invention discloses five sets of embodiments. Some or all of these five sets of embodiments may refer to the same drawings. It is to be understood that each of these five sets of disclosed embodiments may be implemented independently or implemented in conjunction with other sets. Therefore, any information disclosed in a specific set of embodiments may or may not be relevant to the other sets of disclosed embodiments, without limiting the scope of the present invention.

One embodiment of the hybrid system of the present invention is able to generate a ubiquitous indoor and outdoor wireless access cloud over large areas by using multiple transmission and reception OFDM or OFDMA sources as disclosed below. As a result, it is possible to create metro-level, commercial, and wireless point-to-multipoint hot zones, such as WiMAX hot zones. Moreover, this embodiment of the hybrid system of the present invention successfully enables a CATV operator to extend his/her distribution network to include wireless access services, for example, WiMAX (802.16d/e) wireless access services.

BRIEF DESCRIPTION OF THE DRAWINGS

The embodiments of the present invention are herein described, by way of example only, with reference to the accompanying drawings. With specific reference now to the drawings in detail, it is stressed that the particulars shown are by way of example and for purposes of illustrative discussion of the embodiments of the present invention only, and are presented in the cause of providing what is believed to be the most useful and readily understood description of the principles and conceptual aspects of the embodiments. In this regard, no attempt is made to show structural details of the embodiments in more detail than is necessary for a fundamental understanding of the invention, the description taken with the drawings making apparent to those skilled in the art how the several forms of the invention may be embodied in practice. In the drawings:

FIG. 4A-D are schematic illustrations of OFDM or OFDMA multiple downlink channels, in accordance with embodiments of the present invention;

FIGS. 10A-18E are flowcharts illustrating various methods in accordance with some of the embodiments of the present invention.

DETAILED DESCRIPTION

Figure 1A:
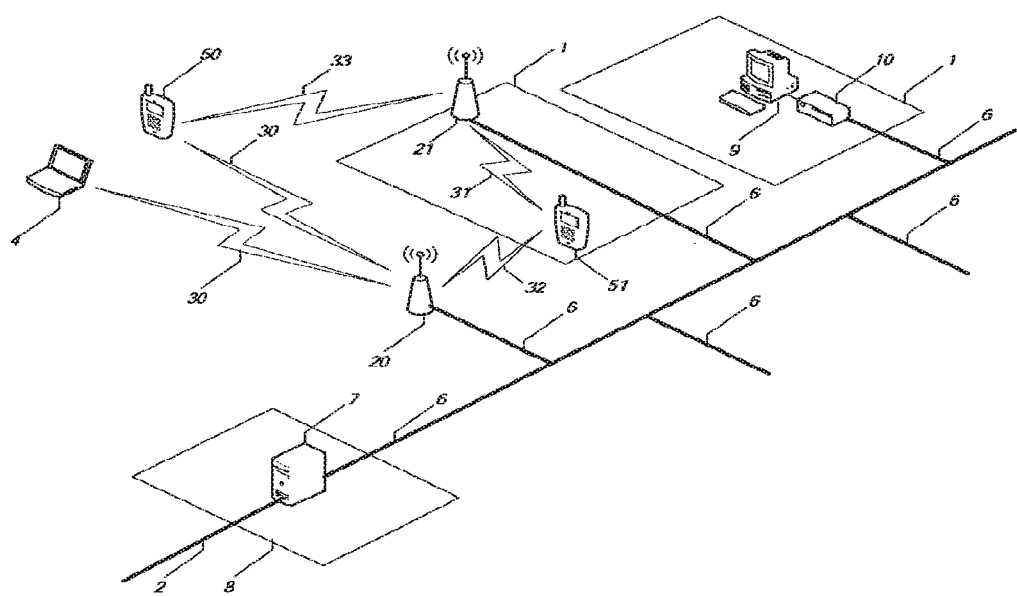
FIG. 1A is a schematic illustration of a wired-wireless point-to-multipoint communication system operated outdoors and indoors, in accordance with the present invention.

Hereinafter, the terms clients, and/or users, and/or wireless users, and/or end-stations, and/or wireless broadband subscriber stations, refer to any device that communicates with the centralized synchronizing communication controller of the present invention.

Hereinafter, the term "wired distribution line" refers to any shared physical line that distributes signals through a medium which is not the air, including, but not limited to, coax lines, fiber optics lines, twisted pair lines, or any combination of these and/or other mediums.

Hereinafter the term 'OFDM', also known as COFDM, refers to any orthogonal multi-carrier modulation.

Hereinafter the term 'OFDMA' refers to any orthogonal multi-carrier modulation with frequency sub-channelization capabilities.

Hereinafter the term "orthogonal multi-carrier modulation" also refers to OFDM, OFDMA, and COFDM.

Hereinafter the term "IEEE 802.16" refers to any wireless point to multipoint communication system with a centralized MAC, and employing multi-carrier modulation.

Hereinafter the term "IEEE 802.16e" refers to any wireless point to multipoint communication system with a centralized MAC, and employing multi-carrier modulation with frequency sub-channelization capabilities.

Hereinafter the term "hybrid converter" refers to a device that adapts between two mediums, such as but not limited to: a) a frequency up-converter and/or down-converter that shifts a first frequency band of an input signal from a wired medium to a second frequency band of a wireless medium, and/or from a first frequency band of an input signal from a wireless medium to a second frequency band of a wired medium; b) a frequency converter between a first wireless frequency and a second wireless frequency and vice versa; c) a converter between a wired signal and a wireless signal and vice versa, wherein the wired frequency is the same as the wireless frequency, such as coax to wireless medium converter, or fiber to wireless medium converter, wherein the fiber to wireless medium converter includes an optical to electrical converter.

Hereinafter the term "centralized synchronizing communication controller" refers to any centralized-communication device capable of injecting a common communication signal into a wired distribution line and communicating, in a synchronized manner, with at least two clients. The centralized synchronizing communication controller achieves synchronization and bandwidth allocation with the at least two clients using a synchronizing Medium Access Controller (MAC). Without limiting the scope of the invention, the following are examples of centralized synchronizing communication controllers: base stations, access points, and Cable Modem Termination Systems (CMTS). The clients may be wired clients, wireless clients, or a combination thereof.

Hereinafter the term "MAP" refers to the transmission slots allocated by a MAC in order to synchronize the uplink and downlink transmissions of all participating clients. It is to be understood that the term MAP is not limited to WIMAX applications although it is readily used by them.

The first set of disclosed embodiments is described herein.

Implementation of the disclosed embodiments enables the installation of several inexpensive stations, with greater coverage, and the locating of all modems in one central location. Locating all modems in one central location may lower maintenance costs, and in certain circumstances, even reduce the number of required modems.

In one embodiment to the first set of disclosed embodiments, the system is a multi-location communication system. In this alternative embodiment, the MAC and PHY are located at a central point. Alternatively, the MAC is located at a central point and each PHY is located at each end-station. This alternative embodiment enables the setting up of communication centers at remote sites, wherein the communication centers feature all or most of the logic and setting up of the end-point stations.

The disclosed embodiments may use SFN with one central modem and a plurality of antennas. Moreover, the embodiments cut costs while obtaining improved coverage—the result of using many antennas.

The first set of disclosed embodiments features a unique method and corresponding system. The unique method and corresponding system enable an efficient means for a centralizing communication node to communicate with a plurality of wireless broadband subscriber stations, in a point-to-multipoint fashion, and using multi-carrier modulation, such as OFDM or OFDMA modulations.

One embodiment of the disclosed Hybrid System communicates with the wireless users via at least two types of mediums at the same time. The first type of medium is a wired medium. Examples of wired mediums are coaxial lines (such as CATV), fiber optics, twisted pair, and copper. The second type of medium is the air. Examples of transmissions through the air include any wireless/RF transmissions such as WiFi and WIMAX.

In one embodiment of the invention, OFDM or OFDMA modulation is implemented. This embodiment has the ability to transmit/receive the same OFDM or OFDMA physical layer modulation signal via both the wired and the wireless portions of the network. As a result, the Hybrid central node becomes capable of injecting the downlink signal into the wired portion first; then the same signal is up-converted to higher frequencies before being transmitted to the subscriber via the wireless portion of the network (and vice versa for the uplink direction). The Hybrid System circumvents the need for two separate physical layer modulation signals for the wired and wireless portions of the network, by using a shared physical layer signal.

Moreover, the usage of long symbol times and long symbol guard times, both inherent characteristics of OFDM and OFDMA modulation schemes, as disclosed herein, provides a method for simultaneously overcoming both the multipath problem, typical to the wireless medium, and the RF/Optical reflection problem, as well as the impulse noise problem, that are typical to the wired medium.

Moreover, the usage of a large number of subcarriers, which is an inherent characteristic of OFDM and OFDMA modulation schemes, as disclosed in the present invention, is a method for simultaneously overcoming the narrowband interference problem that is typical of the wireless medium and the narrowband interference problem that is typical of the wired medium.

The use of synchronizing MAC with the disclosed hybrid system prevents the problem of hidden stations. Examples of MAC's featuring centralized synchronization and scheduling, are IEEE 802.16d/e MAC, WIBRO (developed by the Korean telecoms industry), and HIPERMAN (High Performance Radio Metropolitan Area Network, created by the European Telecommunications Standards Institute (ETSI) Broadband Radio Access Networks (BRAN) group).

Referring to the figures, FIG. 1A illustrates an embodiment of a hybrid wired-wireless point-to-multipoint communication system. Centralized synchronizing communication controller 7, which may also be referred to as a hybrid base station or centralized hybrid communication node, is located inside an operator's distribution node 8. Centralized synchronizing communication controller 7 is connected to the operator's backhaul network 2 on one side, and to a section of the operator's shared signal wired distribution line 6 on the other side. As defined above, the wired distribution line 6 may include, but is not limited to, a fiber optics line, coax line, twisted pair line, or any combination of these or other mediums. Wired distribution line 6 may be a passive wired line, or it may contain amplifiers in both uplink and downlink directions. Wired distribution line 6 may be constructed according to any topology (tree, star, other, or combinations thereof), provided that all the branches of the section driven by centralized synchronizing communication controller 7 share the same spectrum, or in other words, that any signal on the section be present at all of its branches at any given time.

Without limiting the scope of the present invention, an example of wired distribution line 6 is the distribution portion of an HCF (Hybrid Coax Fiber) network commonly used with CATV operators. Another example is transmitting the common signal over telephone line twisted pair, such that the hybrid converters are placed along the twisted pair line.

In one embodiment, the common signal is transmitted over multiple telephone line twisted pairs such that the hybrid converters are placed along the twisted pairs lines, and such that all of the twisted pairs lines are electrically combined near the centralized synchronizing communication controller.

An advantage of the disclosed embodiments of the present invention is that the wireless clients may be standard mobile WIMAX clients, such as IEEE 802.16e.

A plurality of alternative architecture embodiments are available to a communication system in accordance with the present invention. All alternative embodiments are included in the scope of the present invention. FIGS. 1A to 1G illustrate some non-limiting alternative architecture embodiment examples that may be used with almost all of the embodiments herein disclosed.

FIG. 1A illustrates a wired-wireless point-to-multipoint communication system operated outdoors and indoors 1. In this case, the shared signal wired distribution line 6 may comprise, but is not limited to, coax line, fiber-optics line, and a twisted pair line.

Figure 1B:
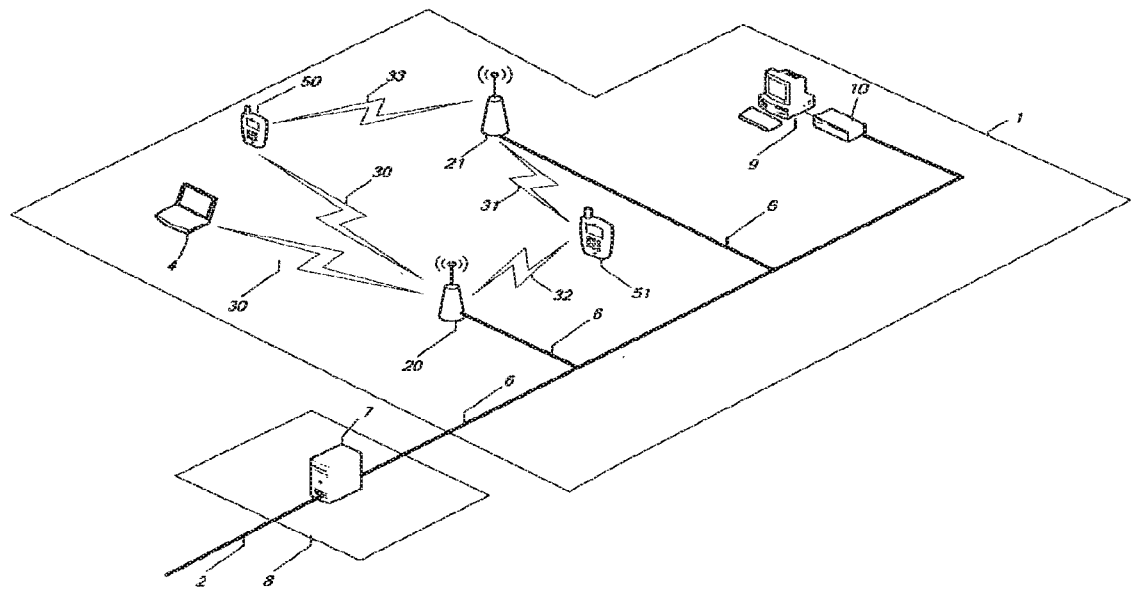
FIG. 1B is a schematic illustration of a wired-wireless and wired-wired point-to-multipoint communication system operated indoors, in accordance with the present invention.

FIG. 1B illustrates a wired-wireless and wired-wired point-to-multipoint communication system operated indoors 1. In this case, the shared signal wired distribution line 6 may comprise, but is not limited to: coax line, fiber-optics line, and a twisted pair line.

Figure 1C:
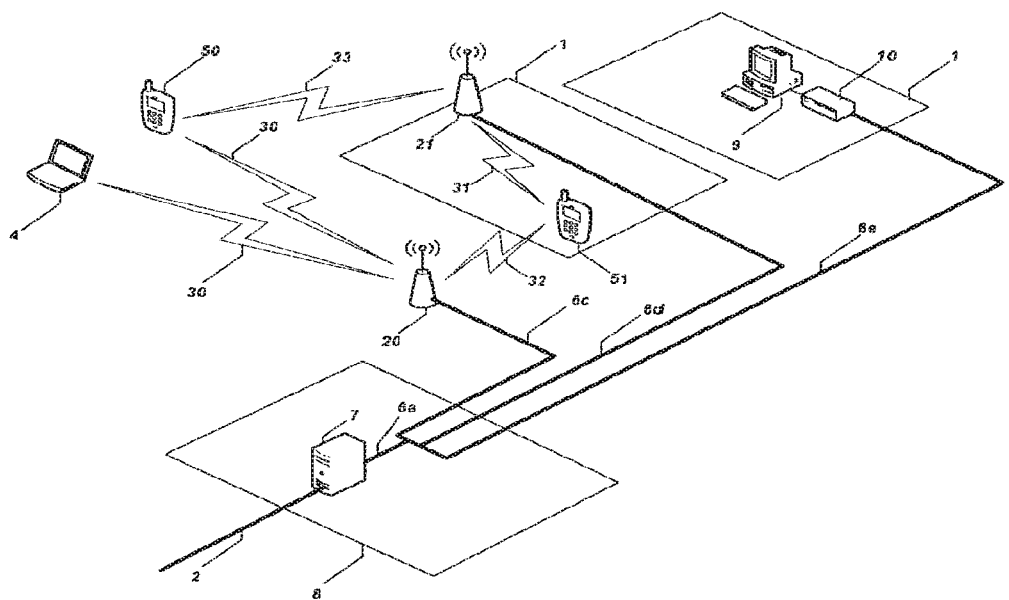
FIG. 1C is a schematic illustration of a wired-wireless and wired-wired point-to-multipoint communication system operated outdoors and indoors, in accordance with the present invention.

FIG. 1C illustrates a wired-wireless and wired-wired point-to-multipoint communication system operated outdoors and indoors 1. In this case, the shared signal wired distribution line 6a comprises multiple short-circuited twisted pair lines 6c, 6d, and 6e.

Figure 1D:
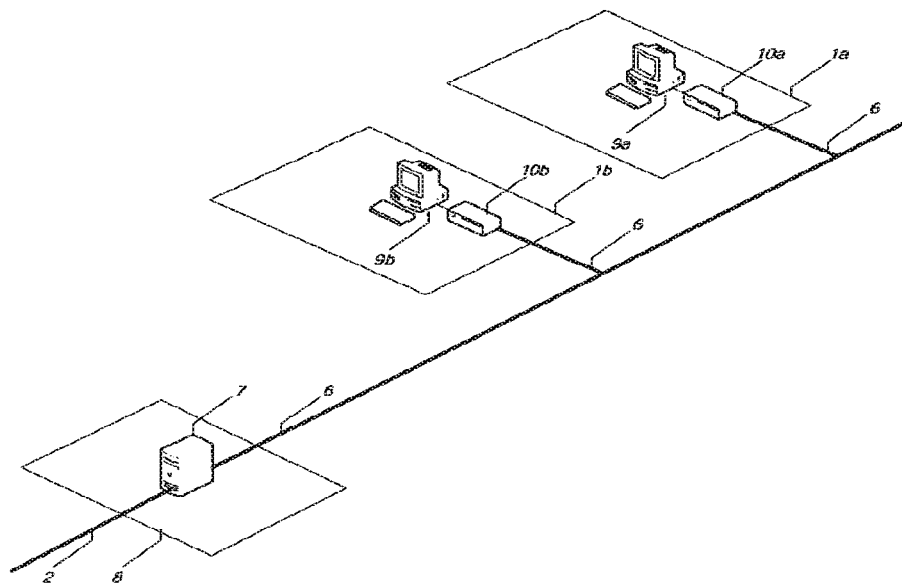
FIG. 1D is a schematic illustration of a wired-wired point-to-multipoint communication system operated indoors, in accordance with the present invention.

FIG. 1D illustrates a wired-wired point-to-multipoint communication system operated indoors 1a, 1b. In this case, the wired distribution line 6 may comprise, but is not limited to: coax line, fiber-optics line, and a twisted pair line.

Figure 1E:
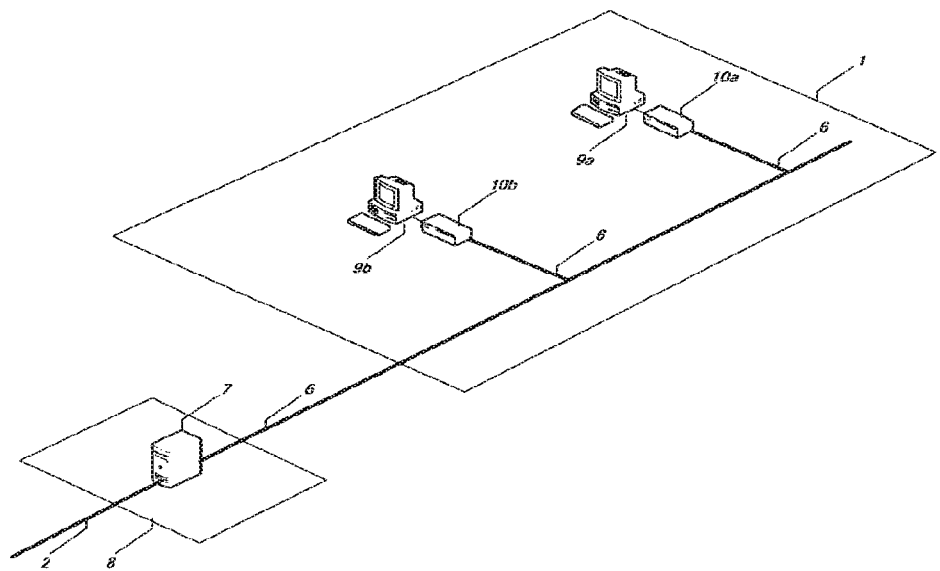
FIG. 1E is a schematic illustration of a wired-wired point-to-multipoint communication system operated in a single indoor area, in accordance with the present invention.

FIG. 1E illustrates a wired-wired point-to-multipoint communication system operated in a single indoor area 1. In this case, the wired distribution line 6 may comprise, but is not limited to: coax line, fiber-optics line, and a twisted pair line.

Figure 1F:
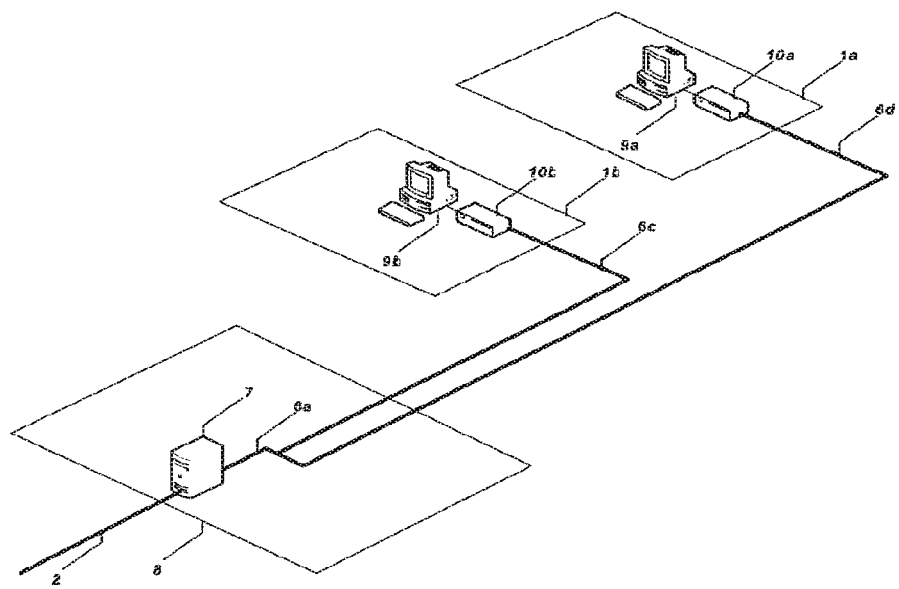
FIG. 1F is a schematic illustration of a wired-wired point-to-multipoint communication system operated indoors, in accordance with the present invention.

FIG. 1F illustrates a wired-wired point-to-multipoint communication system operated indoors 1a, 1b. In this case, the shared signal wired distribution line 6a comprises multiple short-circuited twisted pair lines 6c, 6d.

Figure 1G:
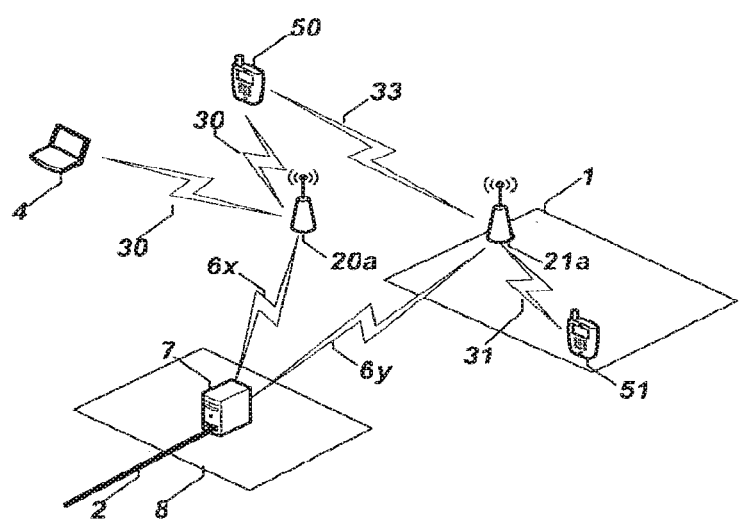
FIG. 1G is a schematic illustration of a wireless-wireless point-to-multipoint communication system, wherein a centralized synchronizing communication controller is communicating through the air, in accordance with the present invention.

FIG. 1G illustrates a wireless-wireless point-to-multipoint communication system, wherein centralized synchronizing communication controller 7 is communicating through the air (6x, 6y) with a plurality of hybrid converters (20a, 21a) that perform a frequency shift and communicate with a plurality of wireless clients.

In one embodiment of the invention, the centralized synchronizing communication controller 7 features a centralized MAC (Medium Access Control) layer that controls the uplink and downlink access to the shared physical layer 6 (also referred to as the wired distribution line) for the plurality of users 4, 50, 51 being serviced by the centralized synchronizing communication controller 7. Users 4, 50, 51 may also be herein referred to as subscriber devices. Without limiting the scope of the present invention, an example of MAC is the IEEE 802.16 MAC layer.

In one embodiment of the invention, the centralized synchronizing communication controller 7 modulates the downlink transmission using multi-carrier modulation such as a OFDM or OFDMA modulation scheme, which can be used to transport the signal over both wired medium and wireless medium. Examples of modulation schemes are the IEEE 802.16 PHY layer, or IEEE 802.11 PHY layer. The modulated signal may be placed in an appropriate portion of the spectrum supported by the specific wired distribution line 6, and may reach directly to the plurality of hybrid wired-wireless converters, referred to as hybrid converters 20, 21. For example, the modulated signal may be placed in optical frequencies in the case of fiber optic line, and downlink RF frequencies in the range of 45-1000 Mhz in the case of a CATV coaxial line.

Figure 2A:
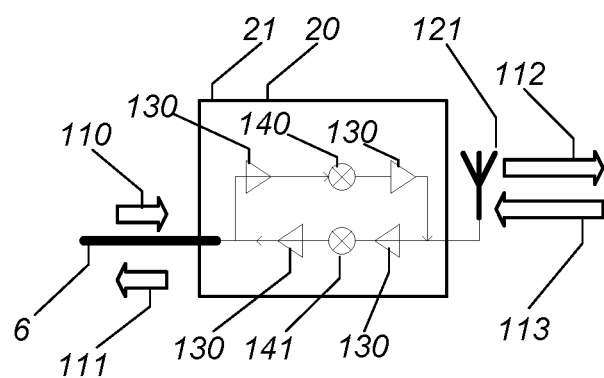
FIGS. 2A-B are schematic diagrams illustrating a hybrid converter, in accordance with embodiments of the present invention.

FIG. 2A illustrates one non-limiting embodiment of a hybrid converter. In the embodiment, the frequency used in transmissions over the wired distribution system is different from the frequency used in the wireless transmission. Hybrid converters 20, 21 receive a downlink modulated signal 110 directly from the wired distribution line 6, and use an up- or down-conversion method to convert signal 110 to an appropriate wireless downlink RF frequency. The RF frequency is then transmitted to the air 112, 30, 31, 32, 33 via antenna 121. For example, hybrid converters may convert the wired signal to the wireless frequencies 0.7, 2.3, 2.5, 3.5, 5.8 Ghz in the case of IEEE 802.16, or 2.4, 5.2, 5.8 Ghz in the case of IEEE 802.11. It is to be understood that before and/or after the up- and/or down-conversion 140, 141, some filtration, amplification and/or optical-to-electrical conversion (in the case of fiber optics medium) may be implemented by using an optional element illustrated in the figure as element 130. Moreover, it is to be understood that the system may operate a large amount of hybrid converters with or without the use of the filter disclosed herein.

Figure 2B:
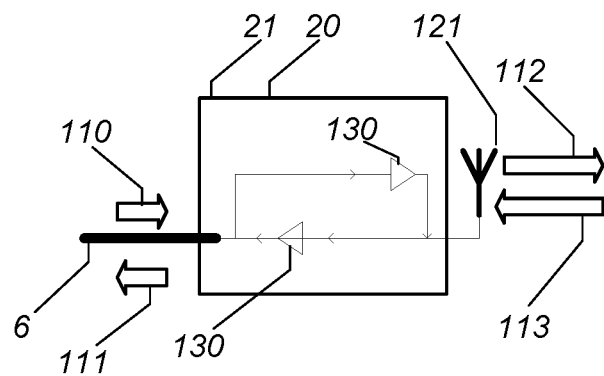

FIG. 2B illustrates another non-limiting embodiment of the hybrid converters (20, 21), wherein the hybrid converter converts between two different mediums, such as, but not limited to: coax and wireless, fiber and wireless, twisted pair and wireless, and fiber and coax. The hybrid converter illustrated in FIG. 2B does not perform a frequency conversion and therefore does not comprise up and down converters, such as up and down converters 140 and 141 illustrated in FIG. 2A.

Referring again to FIGS. 1A-1C, aired transmissions 30, 31, 32, 33 reach all users 4, 50, 51, and therefore allow the centralized synchronizing communication controller 7 to both directly communicate with, and synchronize, them via the point-to-multipoint MAC. It is to be noted that the hybrid converters may not be aware of the actual signal modulation or upper MAC layers, and may be implemented as simple non-regenerative relays of communication between the point-to-multipoint end nodes. In this case, only the centralized synchronizing communication controller 7 and users 4, 50, 51 are performing the actual modulation and demodulation, so that the hybrid converters 20, 21 can be kept simple and cost effective.

Implementing the uplink direction may be performed similarly to implementing the downlink direction, the only difference being that the wireless signals 113, 30, 31, 32, 33 from users 4, 50, 51 are up or down converted 141 to a signal 111 that is placed in an appropriate portion of the uplink spectrum, and supported by the specific wired distribution line 6. Examples of a supported uplink spectrum include optical frequencies in the case of fiber optic line, or, in the case of CATV coaxial line, uplink RF frequencies in the range of 5-65 Mhz.

It is to be understood that hybrid converter 20, 21 may be operated in either TDD or FDD modes, depending on the selection of actual PHY and MAC layers. Moreover, it is to be understood that a wired converter, also referred to as wired modem 10, may be operated to support wired subscribers 9.

FIG. 1B illustrates a system having three wired modems 10 connected to 3 wired subscribers. The communication with the wired converters and/or wired modems 10 may be done similarly to what was described in the wireless clients section above. Centralized synchronizing communication controller may support both wired and wireless clients interchangeably.

As known in the relevant art, when implementing the wired medium with fiber optics, the uplink and downlink feature approximately the same bandwidth. As a result, prior art solutions which implement OFDM over fiber optics are not useful for coax line because prior art solutions do not disclose asymmetric uplink and downlink transmissions. Moreover, prior art solutions do not solve the noise build-up in the uplink direction, nor the hidden station problem in SFN.

The embodiments of the present invention successfully overcome the limitations, and widen the scope of presently known hybrid system configurations over coax by a selection of an appropriate wireless PHY which also solves the coax lines problems of impulse noise and narrow band noise.

Another embodiment of the present invention discloses the use of sub-channelization for the uplink direction as a method of overcoming the thermal noise buildup associated with the return channel of a hybrid system. In one embodiment, the IEEE 802.16d/e standard sub-channelization may be used.

There are cases where the return channel in a hybrid system suffers from a thermal noise buildup that is caused by the simultaneous transmission of multiple hybrid converters in the uplink direction 111. Switching off the hybrid converters may not be possible because each user uses a different sub-channel, as in the case of WIMAX. The embodiments of the present invention disclose two optional solutions to the problem of thermal noise buildup: The first solution is the channel filter as disclosed below. The second solution features the use of OFDMA modulation wherein each user uses only a sub-set of the sub-carriers when transmitting up stream, i.e. the transmitted energy is concentrated in bandwidth, which is narrow in relation to the total bandwidth of the channel. In addition, by using the MAP, each user transmits using a different sub-set. As a result, by using a concentration gain, the uplink uses only a small set of sub-channels. Therefore, because of the concentration gain, the combination of OFDMA over coax introduces the unexpected result of solving the problem of thermal noise buildup up to a predefined number of users.

For example, in a 10 Mhz channelization IEEE 802.16e transmission, each converter contributes its 10 Mhz thermal noise to the overall noise picked by centralized synchronizing communication controller 7 receiver, so that the total sensitivity of centralized synchronizing communication controller 7 is degraded by the amount of: 10*log [Number of Hybrid Converters per uplink channel] dB.

This sensitivity degradation can cause the downlink and uplink directions to become asymmetrically sensitive, which is usually unwanted, since the hybrid system is designed to support bi-directional communication.

The use of the sub-channelization in the uplink direction solves the problem. For example, in the case of IEEE 802.16d/e OFDMA PHY and a 10 Mhz 802.16e channel, the standard describes 35 simultaneous sub-channels in the PUSC mode. If the wireless subscriber is concentrating its power over 1/35 of the total uplink bandwidth (about 300 KHz) over one sub-channel, then it has a concentration gain of: 10*log [Number of sub-channels in uplink channel] dB=10*log [35] dB=15 dB.

Assuming that the transmitted power budget of the hybrid converter is the same as the transmitted power budget of the wireless subscriber (which is reasonable to assume, since the hybrid converter is a small and cheap device), in order to produce a symmetrical link, the uplink thermal noise degradation should be equal to the uplink concentration gain, since in this case the uplink concentration gain advantage over the downlink is exactly balanced by the thermal buildup degradation effect 10*log [35] dB=10*log [Number of Hybrid Converters per uplink channel] dB.

The disclosed embodiment is able to place up to 35 hybrid converters on the same OFDMA Hybrid system's channel, given the above examples and assumptions, without limiting the uplink direction in respect to the downlink direction's range.

Figure 4B:
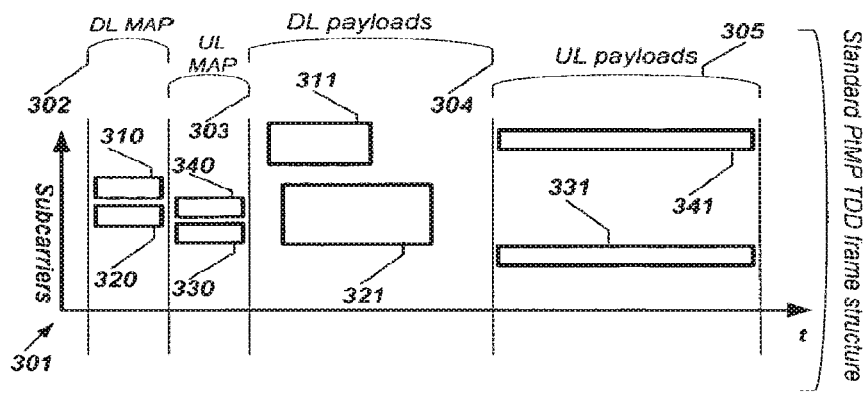
Figure 4B:
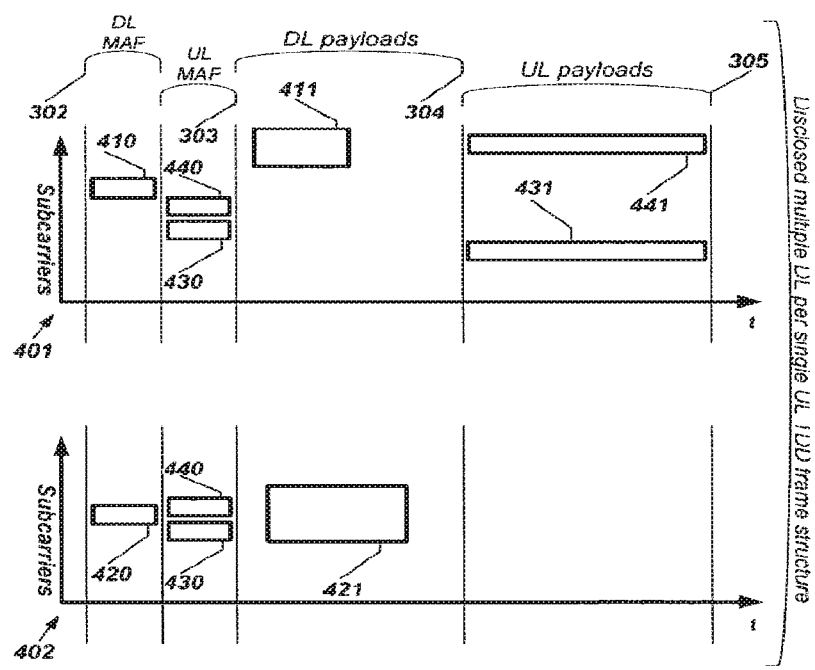
Figure 4D:
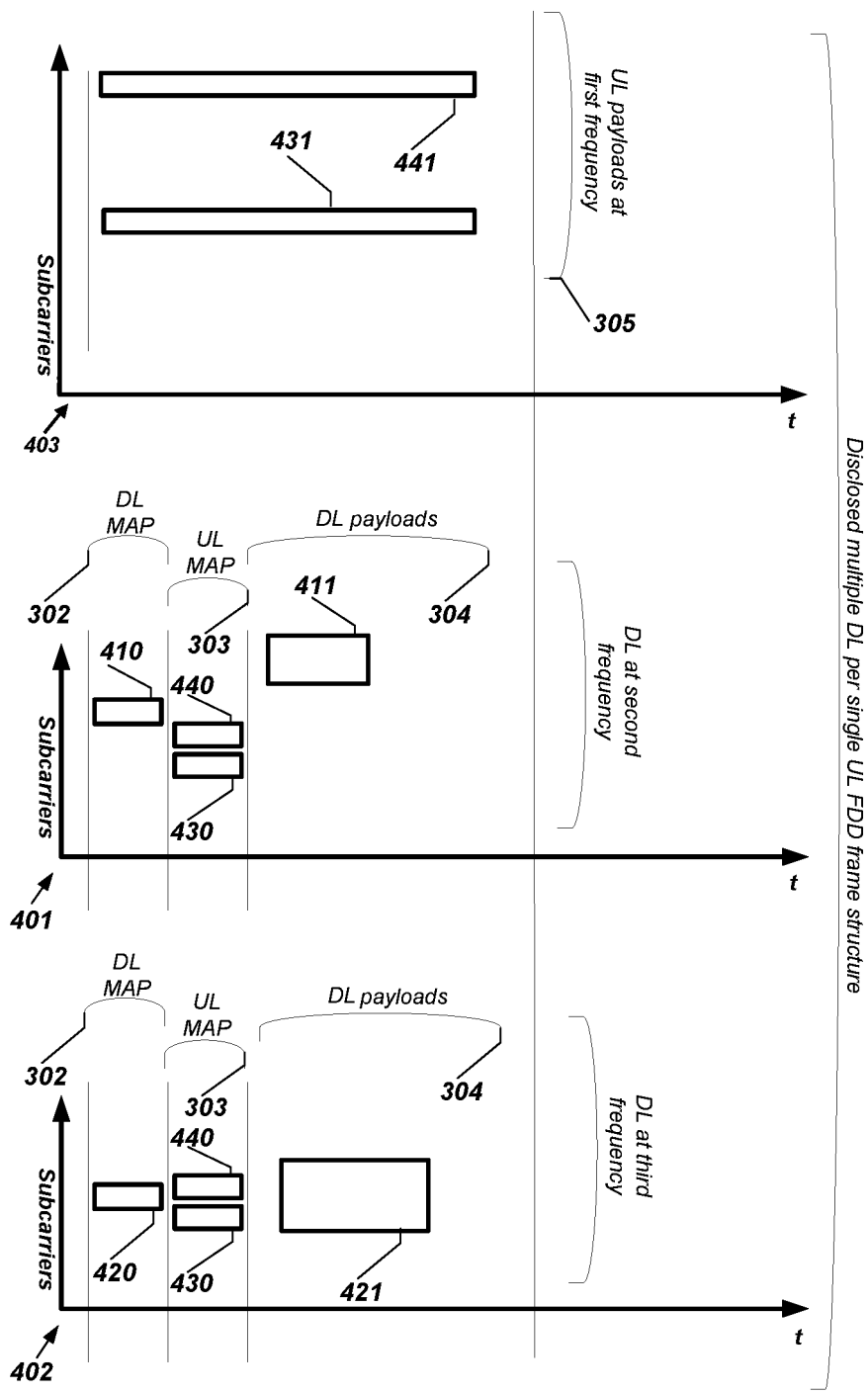

Referring to FIGS. 4A-4B, in one embodiment of the invention, a point-to-multipoint broadcasting MAC that utilizes a downlink/uplink MAP, such as the IEEE 802.16d/e MAC, may be used in order to reach and synchronize a plurality of broadband wireless users via a hybrid wired-wireless medium. The point-to-multipoint broadcasting MAC utilizes a downlink/uplink MAP 302, 303, such as the IEEE 802.16d/e MAC, as a method of reaching and synchronizing a plurality of broadband wireless subscribers via a hybrid wired-wireless medium as illustrated by prior art FIG. 4A.

Referring again to FIG. 2A, in one embodiment of the invention, a TDD (Time Domain Duplex) transmission scheme is implemented, where the wireless downlink 112 frequency is shared with the uplink 113 frequency. In that case, when the MAC starts to transmit the downlink MAP 302, all of the hybrid converters must enable the downlink transmission path (the path converting 110 signal to 112 signal via mixer 140), and disable the uplink transmission path (the path converting 113 signal to 111 signal via mixer 141). An optional embodiment comprises the step of sensing the start of the downlink MAP Preamble transmission energy coming from the centralized synchronizing communication controller 7, and switching to the correct direction, or alternatively by using an explicit switching command from the centralized synchronizing communication controller 7. Referring again to FIG. 4B, the opposite happens (meaning, enabling the uplink path and disabling the downlink path in the hybrid converters) when the uplink 305 time period begins; this event is triggered either by the hybrid converters' counting time beginning when the downlink MAP Preamble transmission energy detection event occurs, or alternatively by an explicit switching command from the centralized synchronizing communication controller 7.

Figure 5:
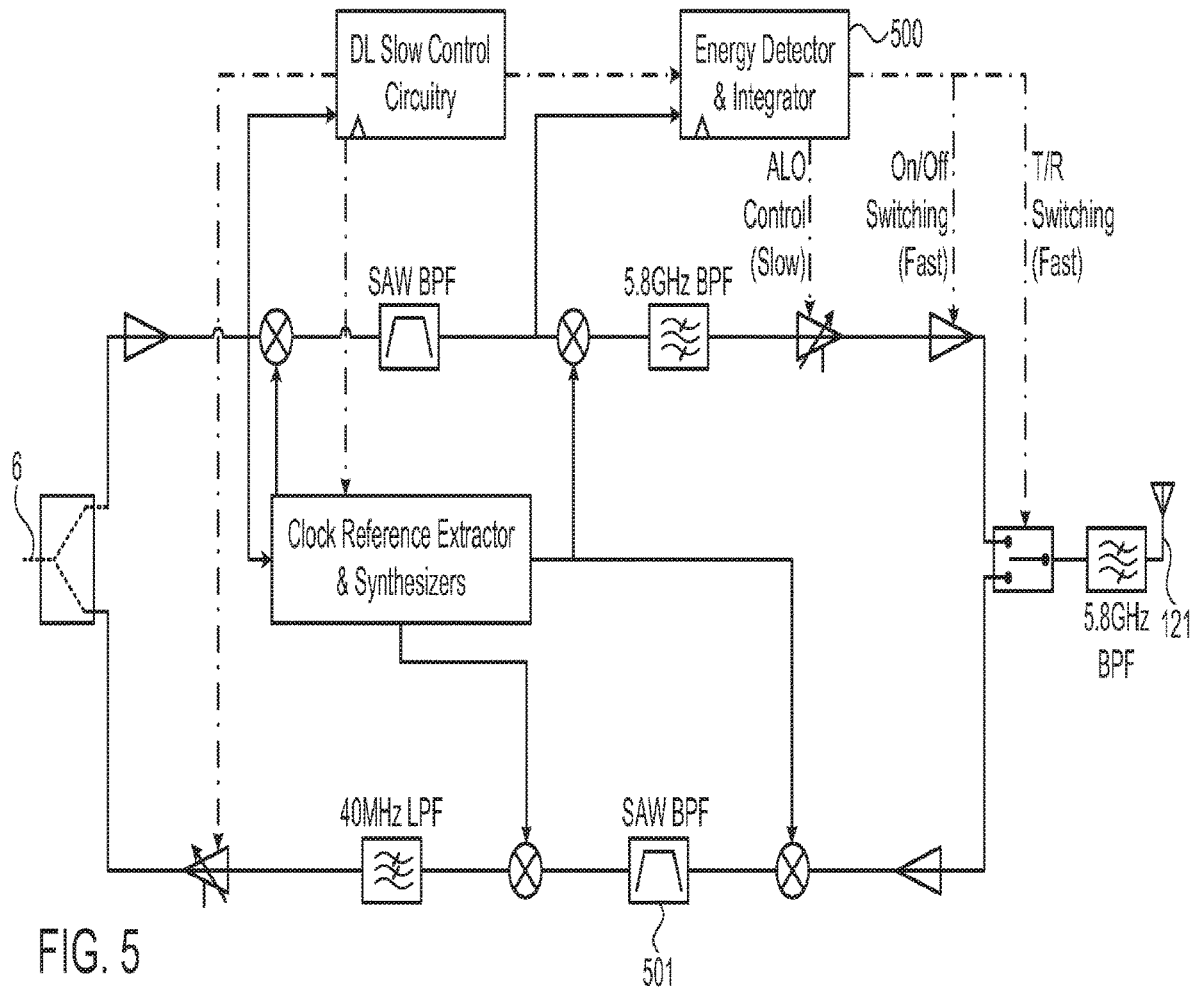
FIG. 5 is a schematic diagram illustrating an exemplary switched hybrid converter, in support of TDD Wireless point-to-multipoint Hybrid system operation, in accordance with one embodiment of the present invention.

Referring again to the figures, FIG. 5 is a schematic diagram illustrating an example of a switched hybrid converter, in support of the above described TDD Wireless point-to-multipoint Hybrid system operation. Exemplified is Block 500 performing the power detection and control switching control.

It is to be understood that non-switched operation of the hybrid converters (meaning that both uplink path and downlink path in the hybrid converters are always enabled) for both wireless TDD or wireless FDD modes is possible, however, it requires the use of more Duplexers, and is susceptible to uplink/downlink RF coupling effects in the case of TDD operation.

It is to be understood that the wired medium may be composed of more than one wired section, such as, but not limited to, a first fiber optics section converted to a second coaxial section.

Figure 10A:
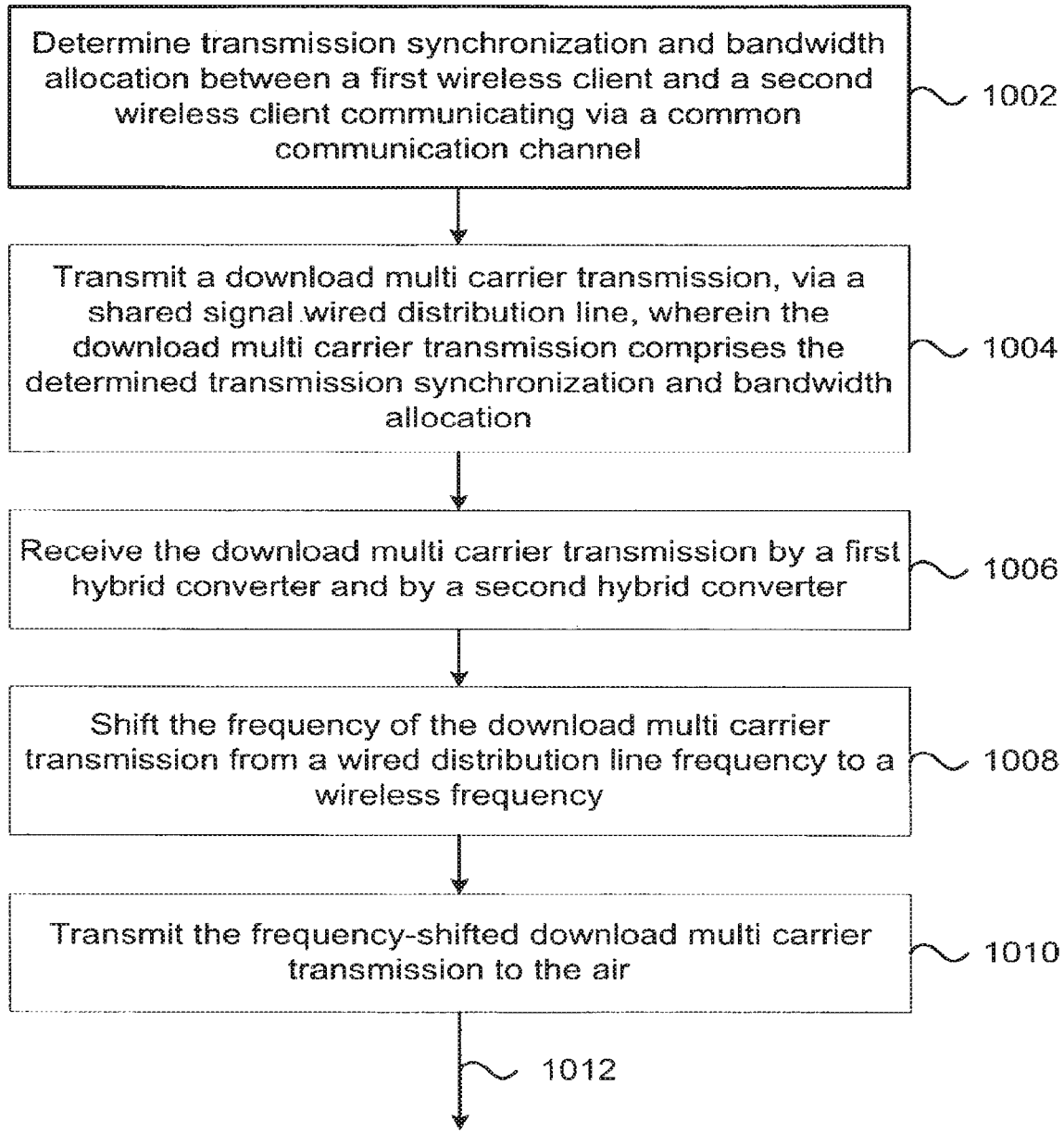
Figure 10B:
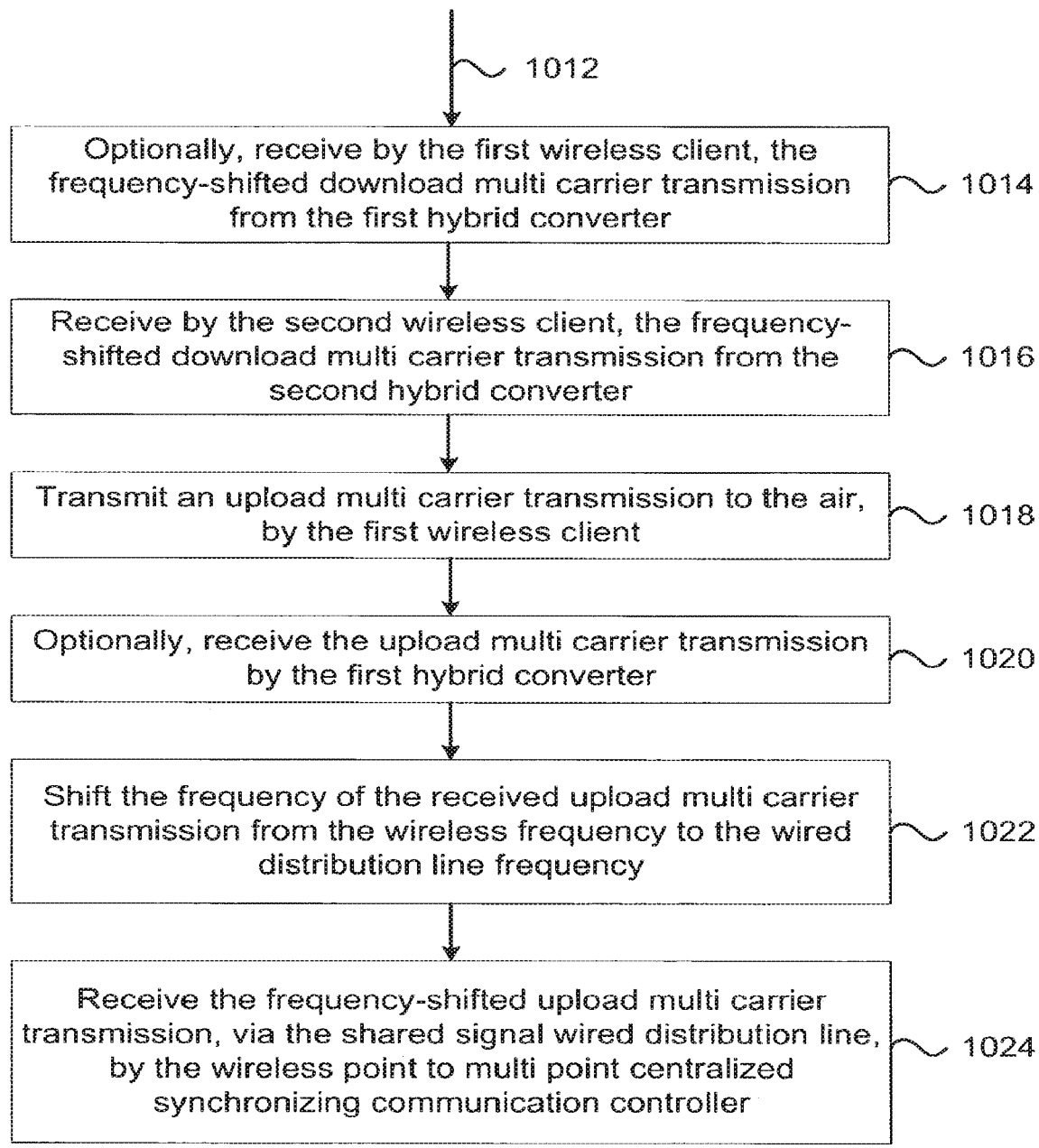
Figure 10C:
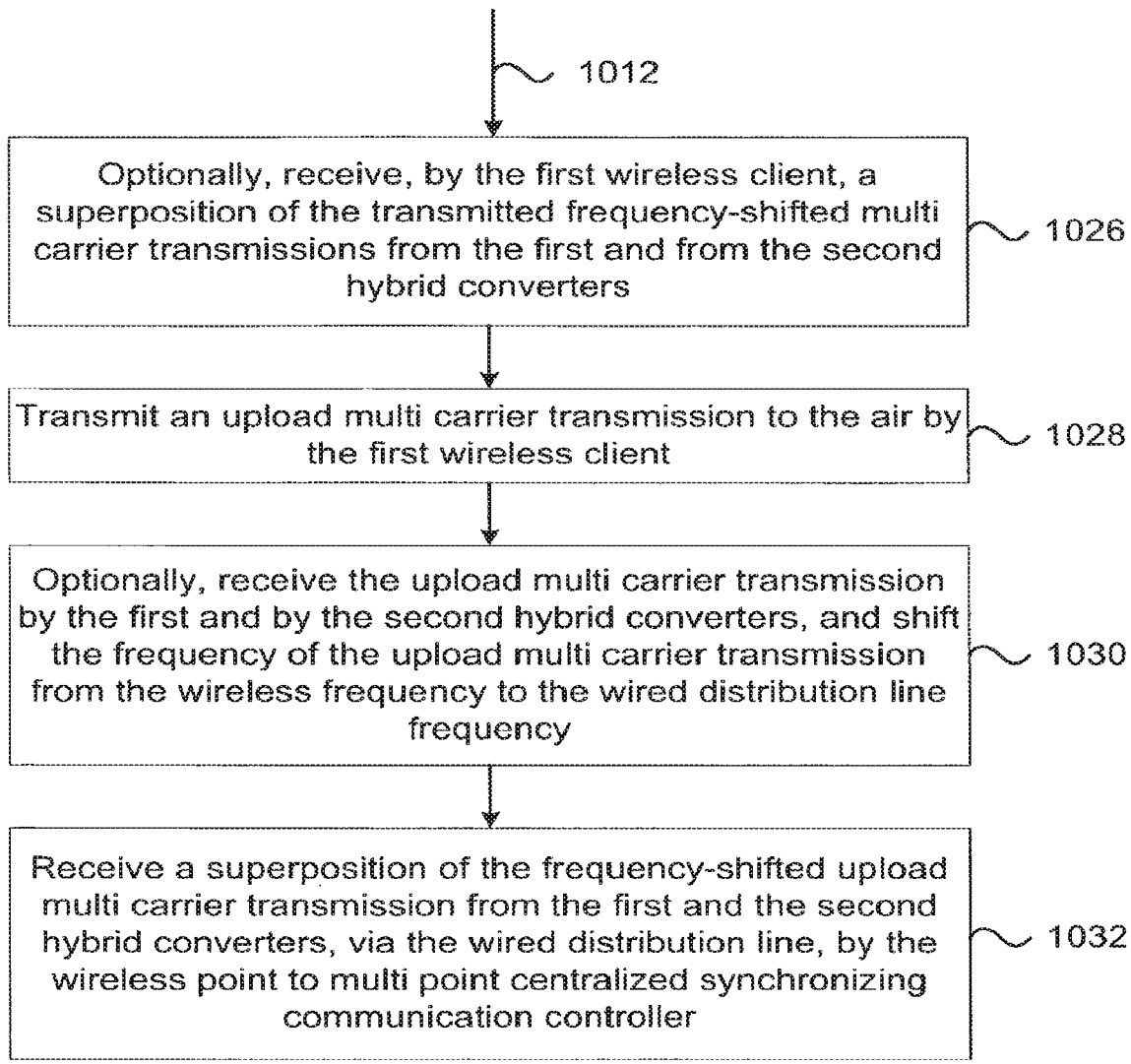

Referring back to the drawings, FIGS. 10A-10C illustrate embodiments having the following steps: In step 1002, determining transmission synchronization and bandwidth allocation between a first wireless client and a second wireless client communicating via a common communication channel, by using a wireless point to multi point centralized synchronizing communication controller; In step 1004, transmitting a download multi carrier transmission, via a shared signal wired distribution line, wherein the download multi carrier transmission comprises the determined transmission synchronization and bandwidth allocation; In step 1006, receiving the download multi carrier transmission by a first hybrid converter and by a second hybrid converter connected to the shared signal wired distribution line; In step 1008, shifting the frequency of the download multi carrier transmission from a wired distribution line frequency to a wireless frequency in the first hybrid converter and in the second hybrid converter; And in step 1010, transmitting the frequency-shifted download multi carrier transmission to the air from the first hybrid converter and from the second hybrid converter.

Continuing 1012 in FIG. 10B, the following optional steps are illustrated: In steps 1014 and 1016, receiving by the first wireless client the frequency-shifted download multi carrier transmission from the first hybrid converter, and receiving by the second wireless client the frequency-shifted download multi carrier transmission from the second hybrid converter; And in step 1016, transmitting an upload multi carrier transmission to the air, by the first wireless client, according to the determined transmission synchronization and bandwidth allocation.

Optional steps 1020, 1022, and 1024 illustrate the following: receiving the upload multi carrier transmission by the first hybrid converter; shifting the frequency of the received upload multi carrier transmission from the wireless frequency to the wired distribution line frequency; and receiving the frequency-shifted upload multi carrier transmission, via the shared signal wired distribution line, by the wireless point to multi point centralized synchronizing communication controller.

Referring again to FIGS. 10A-10B, in one embodiment, the upload multi carrier transmission is modulated by OFDMA and uses an amount of sub-channels that is smaller than the entire composition of the OFDMA channel. In one embodiment, the upload multi carrier transmission is modulated by OFDMA and uses one sub-channel. In one embodiment, the download multi carrier transmission and the upload multi carrier transmission further comprise payloads.

Referring again to FIGS. 10A-10B, in one embodiment, the multi carrier transmissions are modulated by an OFDM or an OFDMA modulation, and the centralized synchronizing communication controller comprises a MAC used by an IEEE 802.16 orthogonal multi carrier modulation. In one embodiment, the wireless clients are standard IEEE 802.16 orthogonal multi carrier modulation mobile clients.

It is to be noted that the term "frequency" as used herein (such as: a first signal having a first frequency) usually refers to a channel-frequency or to a sub-channel-frequency, i.e. the term frequency usually does not imply a single frequency but rather refers to a set of frequencies which are used for transmitting a required signal.

Referring now to FIG. 10C, in one embodiment, the first and the second hybrid converters have at least partially overlapping coverage areas and the first wireless client is located in the overlapping coverage area.

Continuing 1012 in FIG. 10C, the following optional steps are illustrated: In step 1026, receiving by the first wireless client a superposition of the transmitted frequency-shifted multi carrier transmissions from the first and from the second hybrid converters; and in step 1028, transmitting an upload multi carrier transmission to the air by the first wireless client.

Optional steps 1030 and 1032 illustrate the following: receiving the upload multi carrier transmission by the first and by the second hybrid converters, shifting the frequency of the upload multi carrier transmission from the wireless frequency to the wired distribution line frequency; and receiving a superposition of the frequency-shifted upload multi carrier transmission from the first and the second hybrid converters, via the wired distribution line, by the wireless point to multi point centralized synchronizing communication controller.

The meaning of overlapping coverage in accordance with one embodiment is the existence of at least one spatial location that conforms with the criteria that each signal is above the thermal threshold at said location.

Figure 11A:
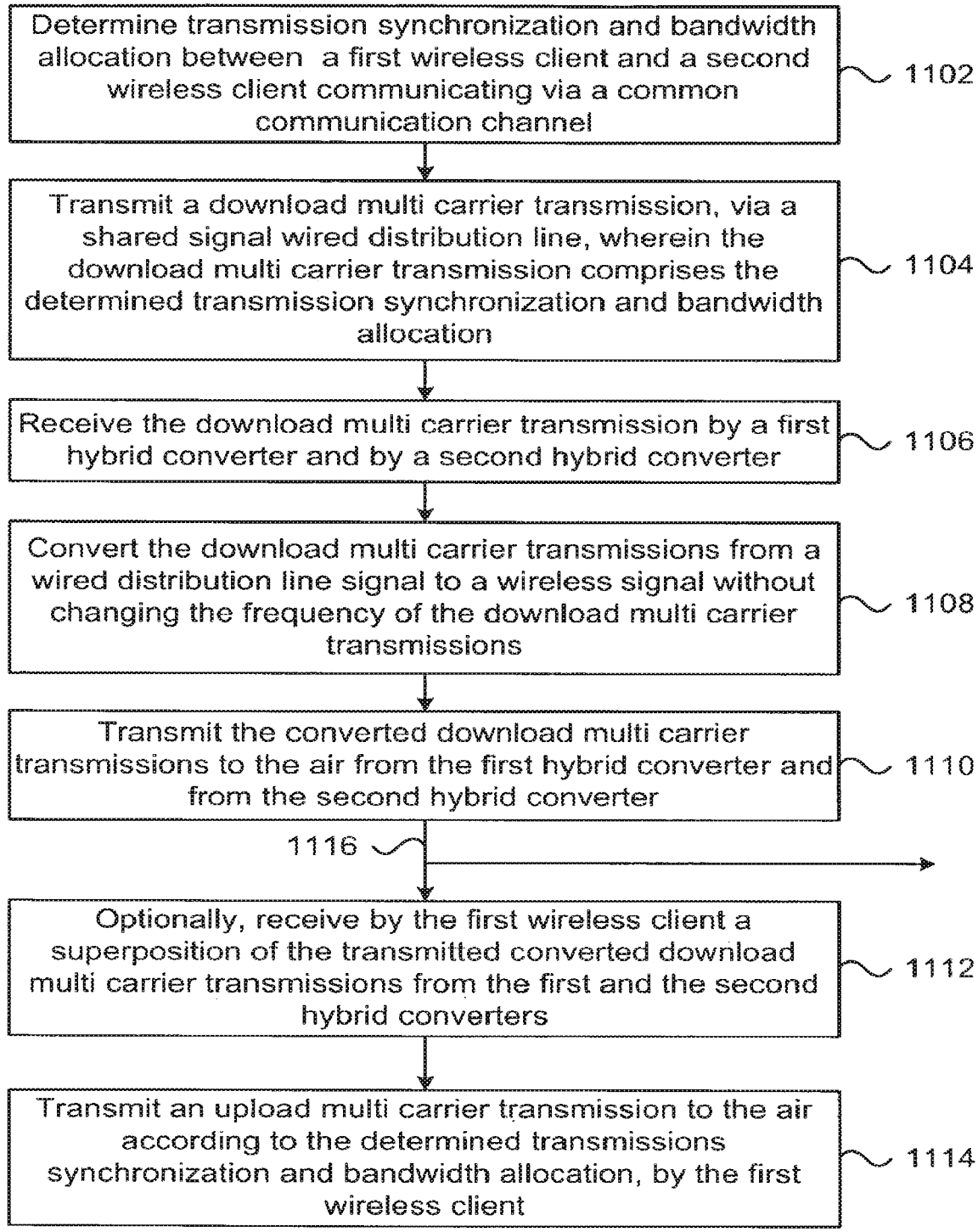
Figure 11B:
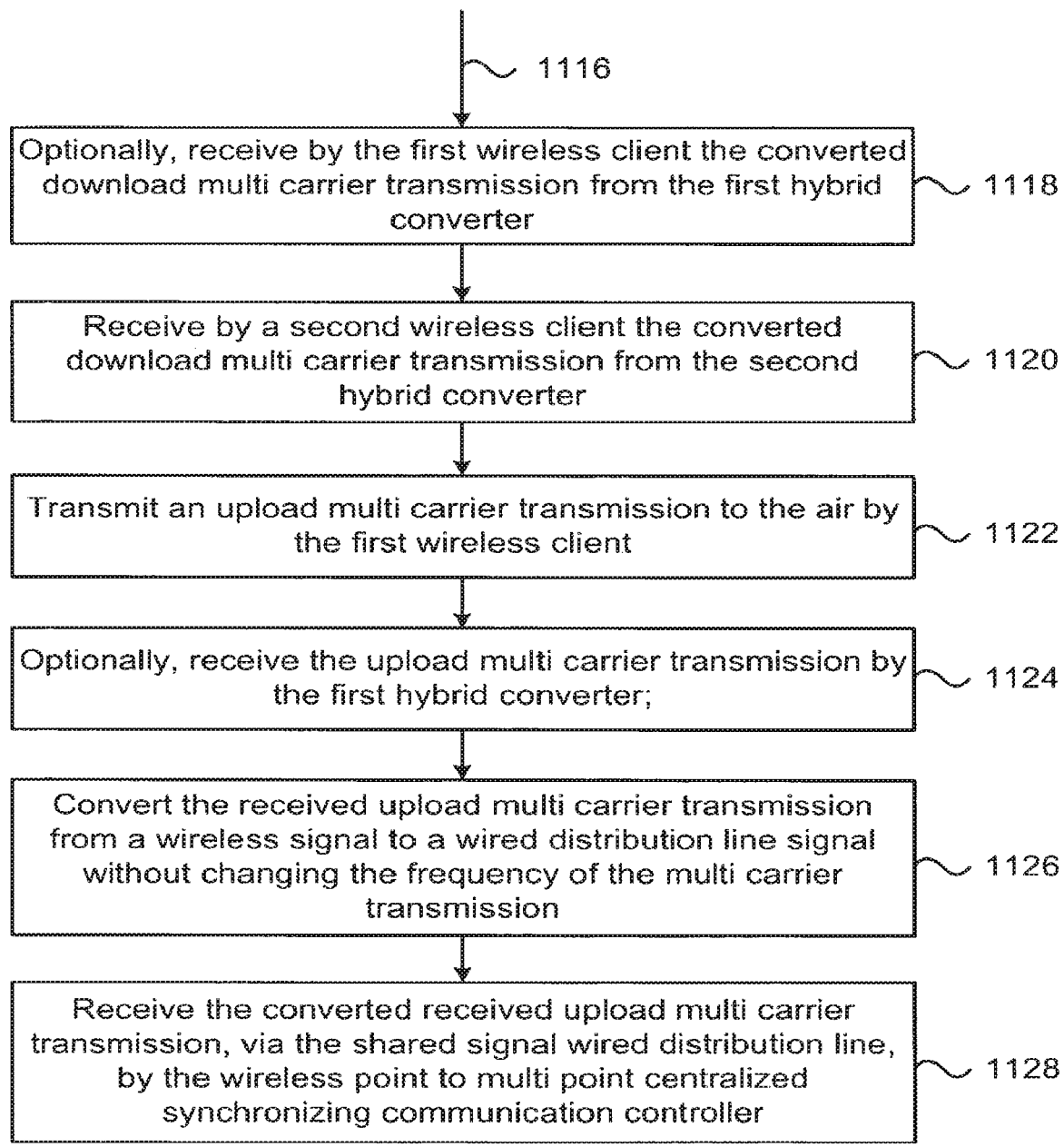

Referring back to the drawings, FIGS. 11A-11B illustrate embodiments having the following steps: In step 1102, determining transmission synchronization and bandwidth allocation between a first wireless client and a second wireless client communicating via a common communication channel, by using a wireless point to multi point centralized synchronizing communication controller; In step 1104, transmitting a download multi carrier transmission, via a shared signal wired distribution line, wherein the download multi carrier transmission comprises the determined transmission synchronization and bandwidth allocation; In step 1106, receiving the download multi carrier transmission by a first hybrid converter and by a second hybrid converter connected to the shared signal wired distribution line; In step 1108, converting the download multi carrier transmissions, in the first hybrid converter and in the second hybrid converter, from a wired distribution line signal to a wireless signal without changing the frequency of the download multi carrier transmissions; And in step 1110, transmitting the converted download multi carrier transmissions to the air from the first hybrid converter and from the second hybrid converter.

Continuing 1116 in FIG. 11B, the following optional steps are illustrated: In steps 1118 and 1120, receiving by the first wireless client the converted download multi carrier transmission from the first hybrid converter, and receiving by a second wireless client the converted download multi carrier transmission from the second hybrid converter; And in step 1122, transmitting an upload multi carrier transmission to the air by the first wireless client according to the determined transmission synchronization and bandwidth allocation.

Optional steps 1124, 1126 and 1128, illustrate the following: receiving the upload multi carrier transmission by the first hybrid converter; converting the received upload multi carrier transmission from a wireless signal to a wired distribution line signal without changing the frequency of the multi carrier transmission; and receiving the converted received upload multi carrier transmission, via the shared signal wired distribution line, by the wireless point to multi point centralized synchronizing communication controller.

Referring again to FIGS. 11A-11B, in one embodiment, the download multi carrier transmission and the upload multi carrier transmission further comprise payloads. In one embodiment, the wireless clients are standard IEEE 802.16 orthogonal multi carrier modulation mobile clients. In one embodiment, the upload transmission is modulated by OFDMA and uses an amount of sub-channels that is smaller than the entire composition of the OFDMA channel. In one embodiment, the upload multi carrier transmission is modulated by OFDMA and uses one sub-channel.

Referring again to FIG. 11A, in one embodiment, the first and the second hybrid converters have at least partially overlapping coverage areas and the first wireless client is located in the overlapping coverage area.

Continuing 1116 in FIG. 11A, the following optional steps are illustrated: In step 1112, receiving by the first wireless client a superposition of the transmitted converted download multi carrier transmissions from the first and the second hybrid converters; And in step 1114, transmitting an upload multi carrier transmission to the air according to the determined transmissions synchronization and bandwidth allocation, by the first wireless client.

Figure 12:
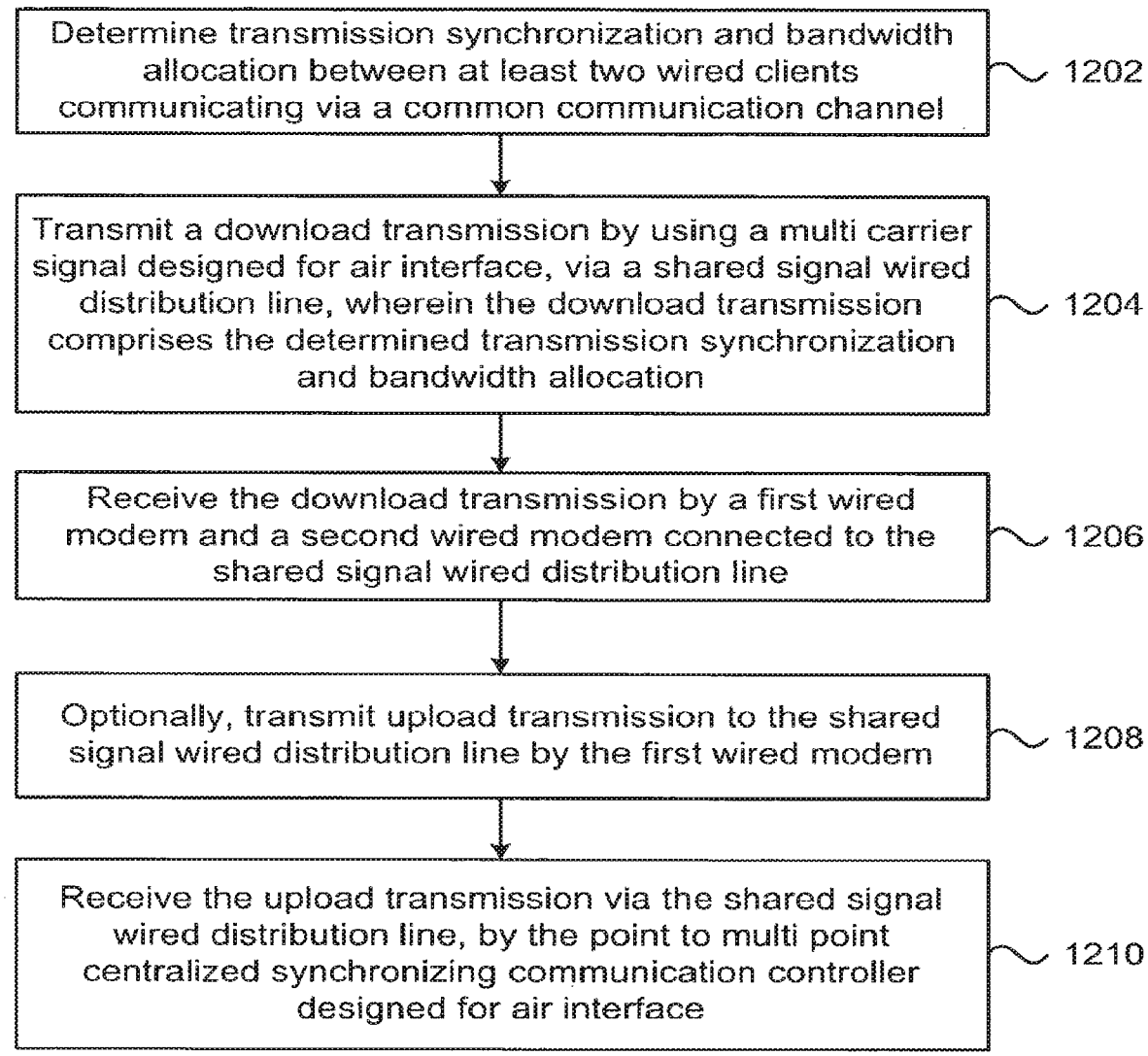

Referring back to the drawings, FIG. 12 illustrates embodiments having the following steps: In step 1202, determining transmissions synchronization and bandwidth allocation between at least two wired clients communicating via a common communication channel, by using a point to multi point centralized synchronizing communication controller designed for air interface; In step 1204, transmitting a download transmission by using a multi carrier signal designed for air interface, via a shared signal wired distribution line, wherein the download transmission comprises the determined transmission synchronization and bandwidth allocation; And in step 1206, receiving the download transmission by a first wired modem and a second wired modem connected to the shared signal wired distribution line.

Continuing in FIG. 12, the following optional steps are illustrated: In step 1208, transmitting upload transmission to the shared signal wired distribution line according to the determined transmission synchronization and bandwidth allocation, by the first wired modem, wherein the upload transmission is a multi-carrier signal designed for air interface; And in step 1210, receiving the upload transmission via the shared signal wired distribution line, by the point to multi point centralized synchronizing communication controller designed for air interface.

In one embodiment, the upload transmission is modulated by OFDMA and uses an amount of sub-channels that is smaller than the entire composition of the OFDMA channel.

Referring again to FIG. 12, in one embodiment, the multi carrier transmission is modulated by an OFDM or an OFDMA modulation, and the centralized synchronizing communication controller comprises a MAC used by an IEEE 802.16 orthogonal multi carrier modulation. In one embodiment, the air interface is an IEEE 802.16 orthogonal multi carrier modulation. In one embodiment, the download transmission and the upload transmission further comprise payloads. In one embodiment, the shared signal wired distribution line is selected from the group of: twisted pair, coax, fiber optics, and a combination thereof.

It is to be understood that the wired medium may be composed of more than one wired section, such as, but not limited to, a first fiber optics section converted to a second coaxial section.

The second set of disclosed embodiments relates to a method for creating a ubiquitous indoor and outdoor wireless communication access cloud featuring an embodiment of the hybrid system having multiple hybrid converters acting as a plurality of transmitting/receiving elements.

The ubiquitous indoor and outdoor wireless communication access cloud may be also referred to as access field.

The access field features a plurality of hybrid converters that are downlinked wirelessly, and transmit an identical time symbol modulation signal (simulcasting), so that a transmission 'field' from multiple sources is created, enabling any wireless client device to 'see' a uniform and ubiquitous access channel. The wireless client device may also be referred to as 'user'. The effect is reciprocal in the uplink direction. In one embodiment of the invention, the access field is produced under the above disclosed hybrid system featuring OFDM or OFDMA.

One embodiment of the invention may create a ubiquitous OFDM or OFDMA wireless access field over large indoor and outdoor areas, using a plurality of short-range, thin hybrid converters. The resultant field may extend to the accumulation of all of the hybrid converters participating in the common field group and may be perceived by a wireless client as one big coverage zone. Optionally, this embodiment may enable the creation of at least one large wireless WiMAX access zone, without the need for a centralized radiating base station.

The second set of disclosed embodiments may enable the creation of at least one large wireless WiFi access zone, without the need for elaborate frequency planning and complex handover mechanisms between multiple independent WiFi access points, as is the case with conventional WiFi hot zone solutions.

In one embodiment, the access field effect may be used by a CATV operator that uses a plurality of short-range, thin hybrid converters to create large-scale access regions that are suitable for delivery of metro level wireless zones.

The access field effect embodiments may introduce one or more of the following aspects:

(a) Many small hybrid converters create one uniform and ubiquitous wideband access cloud.

(b) A wireless client user moving in the generated field does not see many separate channels, but rather one continuous access channel that is extended over the accumulation of all hybrid converters creating the access field.

(c) The plurality of hybrid converters are not interfering with each other. Instead, they are actually enhancing the accumulated RF field strength at any point in space that is influenced by a number of such hybrid converters (and similarly for the uplink direction).

Prior art Single Frequency Network (SFN) is a type of radio network that operates several transmitters on a single frequency. To avoid interference, each station is usually run synchronously with the others, using GPS or a signal from a main station or network as a reference clock. Both radio and television transmissions may be used in conjunction with SFN.

Synchronization of multiple signals can prove to be very difficult, particularly in systems that require high bandwidth. Most attempts at repeating analog television on the same channel results in "ghosting," since the repeater creates a second path of information (multipath). However, the conversion to digital television will allow SFNs to be used reliably for carrying moving images. This is easiest in systems that use OFDM as the transmission mechanism. OFDM uses a large number of very low bandwidth signals, so it is fairly easy to synchronize multiple transmitters. DVB-T (used in Europe and many other areas) and ISDB-T (used in Japan) both use OFDM and are well-suited for SFN operation. OFDM is also widely used in digital radio systems.

The method of creating a ubiquitous indoor and outdoor access field may introduce the following aspects:

(a) Prior art SFN networks need elaborate synchronization mechanisms to allow the plurality of transmitters/receivers to transmit the same information at the exact same time, whereas an embodiment of the system achieves a natural state of synchronization by utilizing the joint wire-wireless common modulation that spans both the wired and the wireless interface.

(b) Prior art SFN networks are intended for broadcasting (TV, Radio etc.), whereas the embodiments of the system of the present invention enable general-purpose bi-directional communication networking.

(c) Prior art SFN networks require separate modems for the backhaul and access layers, whereas the embodiments of the system of the present invention require only a single type of modem and modulation for both backhauling and access/distribution.

Moreover, prior art WiFi access points are being used at the corporate level to deliver wireless access across many floors and buildings. The overall coverage is achieved by deploying multiple access points, where each access point covers a small area with a different frequency. Prior art WiFi indeed achieves large area coverage using multiple access points, but the user sees many access channels when trying to move around, and therefore is forced to switch channels when moving. In contrast to prior art, disclosed embodiments of the present invention feature an access field effect. The access field effect creates an access region spanning many hybrid converters, but still looking like one continuous channel to the client devices.

The second set of disclosed embodiments is better understood and will become apparent to one ordinarily skilled in the art upon examination of the following description, which together with the accompanying drawings, illustrate the embodiments of the present invention in a non-limiting fashion.

Referring to FIG. 1A and FIG. 2A, illustrating one embodiment of the hybrid system featuring a plurality of hybrid converters, 20 and 21; hybrid converter 20 is located outdoors and hybrid converter 21 is located in indoors area 1. Another aspect is that almost any arbitrary arrangement of hybrid converters distributed in any outdoor and indoor deployment is possible. Moreover, the hybrid system may even perform better than a base station located outdoors, in terms of the resulting access field generation. To generate the access field of the embodiment, a plurality of hybrid converters 20 and 21 are connected to one wired distribution line 6, and grouped together in such a way that each of the hybrid converters within the group is down-converting or up-converting the identical frequency channel 110 (modulated signal) from the centralized synchronizing communication controller 7 to identical wireless RF frequency channel 112 at any given time (which is possible since the entire group shares the same wired distribution line 6). It is to be noted that the group of hybrid converters may include all the hybrid converters connected to the wired distribution line 6, or may include only a portion of them; Several groups are possible within the wired distribution line 6; Such groups are referred to as common field groups.

In the case where hybrid converters 20 and 21 form a common field group, resulting wireless orthogonal multi-carrier modulated signals 30 and 32 that are generated by hybrid converter 20 are carrying the identical information as wireless orthogonal multi-carrier modulated signals 31 and 33 generated by hybrid converter 21. Outdoor wireless client device 50 (illustrated in a non-limiting fashion as a phone) is receiving wireless transmissions 30 and 33, because it happens to be in a range of both hybrid converter 20 and hybrid converter 21; the combined signal of 33 and 30 is produced on the antenna of client device 50, in a way that the resulting signal is stronger than what would have been produced if either hybrid converter 20 or hybrid converter 21 would have transmitted in different field groups. Similarly, indoor area 1 client device 51 is receiving the combination of RF signals 31 and 32, because it happens to be in the range of both hybrid converter 20 and hybrid converter 21. Client device 4 (illustrated in a non-limiting fashion as a laptop), happens to be only in the range of hybrid converter 20, and is therefore receiving only its signal 30, which is still sufficient to decode the downlink transmission. In one embodiment, the orthogonal multi-carrier modulated signals are OFDM signals and/or OFDMA signals.

The above description of the downlink transmission to client devices 4, 50, and 51 may similarly be applicable to the uplink direction, so that when client device 50 is transmitting, some of its signal 33 is reaching hybrid converter 21 and, at the same time, some of its signal 30 is reaching hybrid converter 20. Both converters may up-convert the same wireless RF channel 113 to the same signal channel 111 that is placed on the common wired distribution line 6. Both signals may be naturally combined on wired distribution line 6 at the OFDM or OFDMA level to yield a better and stronger signal for centralized synchronizing communication controller 7 to decode.

Reference is now made to the following example, which together with the above description, illustrates the invention in a non-limiting fashion. In this embodiment, the common field effect is achieved under the following assumptions regarding the multi-carrier modulation, coherence bandwidth, and inter-symbol guard time criteria, as disclosed hereinbelow.

Figure 3:
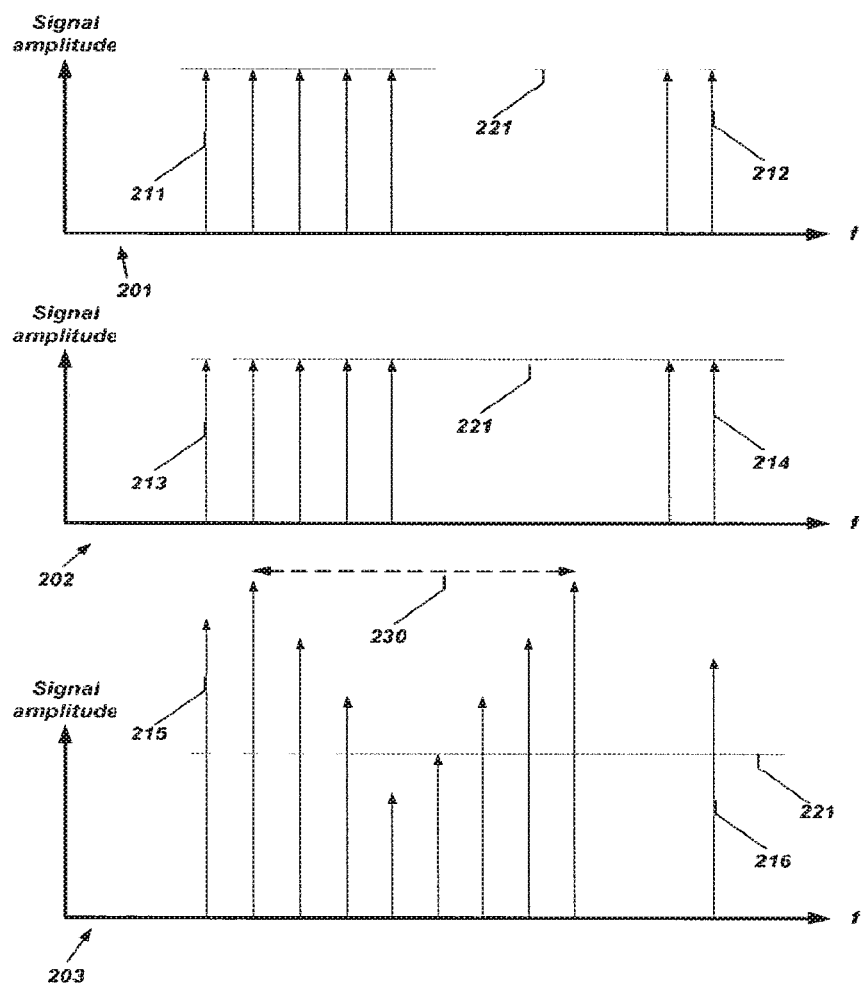
FIG. 3 is a schematic illustration of OFDM or OFDMA signal combining at the sub-carrier level, in accordance with one embodiment of the present invention.

Referring now to the multi-carrier modulation and coherence bandwidth criteria, in order for the access field effect to occur the modulation has to be of a multi-carrier (or multi-tone) type, also known in the wireless industry as OFDM (Orthogonal Frequency Division Multiplexing) or OFDMA (Orthogonal Frequency Division Multiple Access). Referring to FIG. 3, in an OFDM or OFDMA modulation, the information is transported over a multiple number of sub-carriers 211 to 212, such that the entire transmission bandwidth is the sum of all subcarriers in the signal. When two or more hybrid converting sources 20 and 21 are transmitting over the same bandwidth with the same information, using OFDM or OFDMA modulation (as is the case in the access field effect), the resultant signal illustrated in graph 203 is produced on the antenna of client device 50. Subcarrier 215 has a total power resulting from the corresponding subcarrier 211 transmitted by hybrid converter 20 in the wireless signal 30 plus the corresponding subcarrier 213 transmitted by hybrid converter 21 in wireless signal 33. Subcarrier 215 has a higher power than what would have resulted if the hybrid converters 20 or 21 were to transmit alone. Since the exact amplitudes of the resulting subcarriers 215 to 216 are dependent on the exact time delay between signals 33 and 30, and on the exact location of the specific subcarrier in the frequency domain, the span of all resulting subcarriers may vary from very high (constructive interference) to very low (destructive interference). It is for this reason that OFDM or OFDMA are used, so that when considering all subcarriers involved in the transmission, on the average, the net effect for all subcarriers is a boost in the overall power received by the client 50.

In the above illustrated embodiment, the net time delay between signals 33 and 30 as perceived by client 50 (as a result of both wired medium path differences and free space propagation path differences) should conform to the following relation: $\Delta t > 1/\Delta f$.

Where $\Delta f$ is the coherence bandwidth, referred to as 230. $\Delta f$ should be smaller than or equal to the total frequency span of subcarriers participating in the transmission. For example, in the case of an IEEE 802.16 OFDMA (also known as Scalable-OFDMA) channel of 10 MHz that contains 1024 subcarriers, the minimal time delay between any two hybrid converters is recommended to be: $\Delta t > \frac{1}{10}$ Mhz; $\Delta t > 0.1$ µS.

If the delay requirement is translated to the minimal difference in wired infrastructure length between any two hybrid converters, a minimal distance difference recommendation of about 0.1 µS*1.5 e8=15 m is received. It is assumed that the propagation velocity of the signal in the wired medium is about 1.5 e8 [m/s].

The above described multi-carrier criterion is relevant for the uplink case as well, and the analysis is similar, the only difference being that the receiver is located at the side of the centralized synchronizing communication controller 7.

Referring now to the inter-symbol guard time criterion, in order for the access field effect to occur and to avoid inter-symbol interferences caused by long delays between signals arriving from/coming to different hybrid converters, the modulation should be of a type that allows for long guard periods between consequent symbols. The criterion for inter-symbol guard time can be expressed as follows: Tg>Dmax.

Where Dmax is the wired propagation delay of the downlink signal going between the two outermost hybrid converters. In a non-limiting fashion, translated into distance, assuming that the propagation velocity of the signal in the wired medium is about 1.5 e8 [m/s], and assuming that the dimensions of wired distribution line 6 are limited to 1 km, the following is received: Tg>1000 m/1.5 e8 [m/s]; Tg>7 µS.

Therefore, there is a need for a modulation capable of very long guard times, such as OFDM or OFDMA. Without limiting the scope of the present invention, IEEE 802.16 Scalable-OFDMA can provide guard time of about 10 µS, which makes it a suitable modulation scheme for creating the access field of the present invention.

Figure 13A:
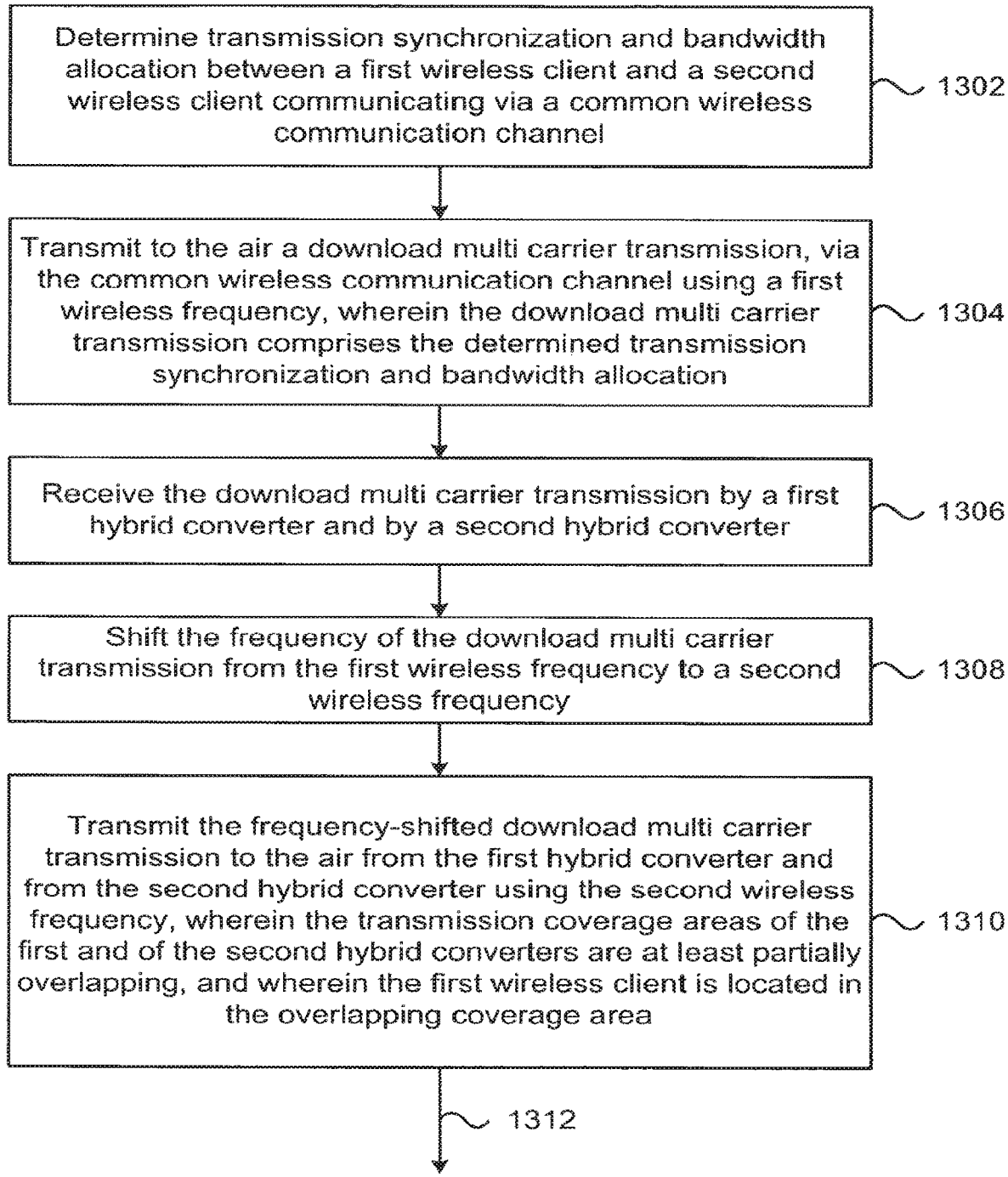
Figure 13B:
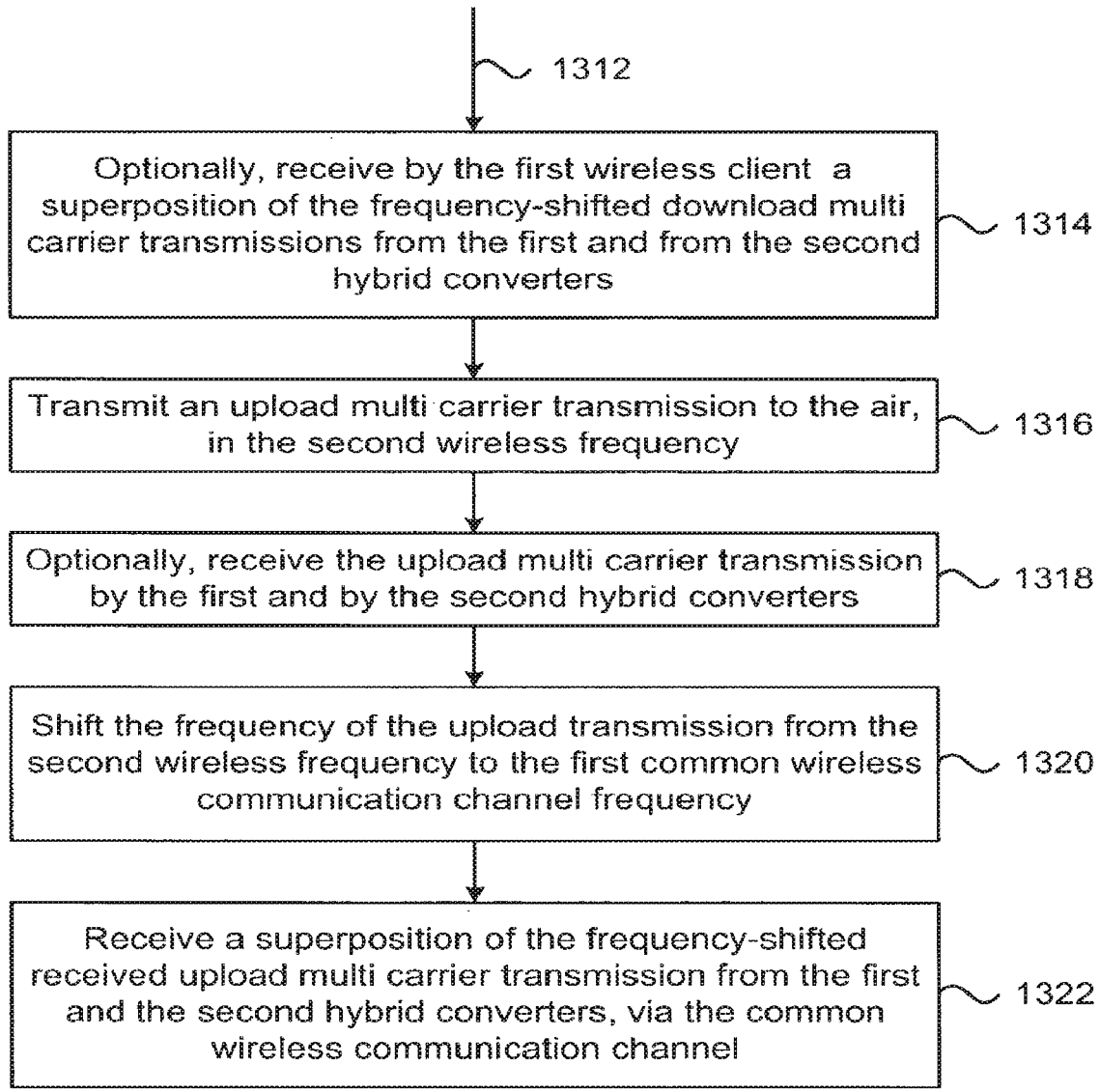

Referring back to the drawings, FIGS. 13A-13B illustrate embodiments having the following steps: In step 1302, determining transmission synchronization and bandwidth allocation between a first wireless client and a second wireless client communicating via a common wireless communication channel, by using a wireless point to multi point centralized synchronizing communication controller; In step 1304, transmitting to the air a download multi carrier transmission, via the common wireless communication channel using a first wireless frequency, wherein the download multi carrier transmission comprises the determined transmission synchronization and bandwidth allocation; In step 1306, receiving the download multi carrier transmission by a first hybrid converter and by a second hybrid converter; In step 1308, shifting the frequency of the download multi carrier transmission from the first wireless frequency to a second wireless frequency in the first hybrid converter and in the second hybrid converter; And in step 1310, transmitting the frequency-shifted download multi carrier transmission to the air from the first hybrid converter and from the second hybrid converter using the second wireless frequency, wherein the transmission coverage areas of the first and of the second hybrid converters are at least partially overlapping, and wherein the first wireless client is located in the overlapping coverage area.

Continuing 1312 in FIG. 13B, the following optional steps are illustrated: In step 1314, receiving by the first wireless client a superposition of the frequency-shifted download multi carrier transmissions from the first and from the second hybrid converters; And in step 1316, transmitting an upload multi carrier transmission to the air, in the second wireless frequency, according to the determined transmission synchronization and bandwidth allocation, by the first wireless client.

Optional steps 1318, 1320, and 1322 illustrate the following: receiving the upload multi carrier transmission by the first and by the second hybrid converters; shifting the frequency of the upload transmission from the second wireless frequency to the first common wireless communication channel frequency; and receiving a superposition of the frequency-shifted received upload multi carrier transmission from the first and the second hybrid converters, via the common wireless communication channel, by the wireless point to multi point centralized synchronizing communication controller.

Referring again to FIGS. 13A-13B, in one embodiment, the upload transmission is modulated by OFDMA and uses an amount of sub-channels that is smaller than the entire composition of the OFDMA channel. In one embodiment, the upload transmission is modulated by OFDMA and uses one sub-channel. In one embodiment, the download transmission and the upload transmission further comprise payloads.

Referring again to FIGS. 13A-13B, in one embodiment, the download transmission further comprises a payload. In one embodiment, the multi carrier signal is an OFDM or OFDMA signal and the centralized synchronizing communication controller comprises a MAC used by an IEEE 802.16 orthogonal multi carrier modulation. In one embodiment, the wireless clients are standard IEEE 802.16 orthogonal multi carrier modulation mobile clients.

Figure 14A:
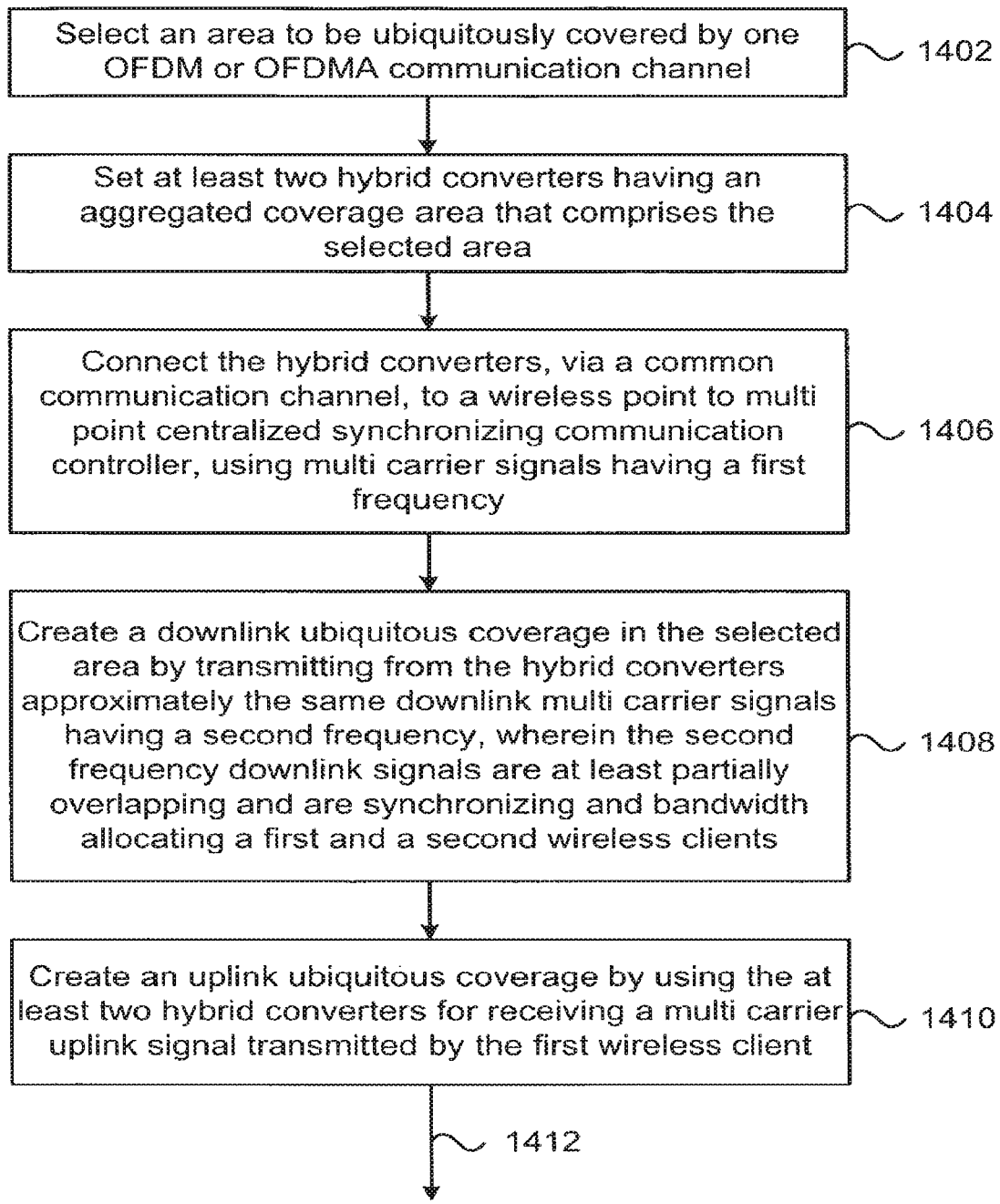
Figure 14B:
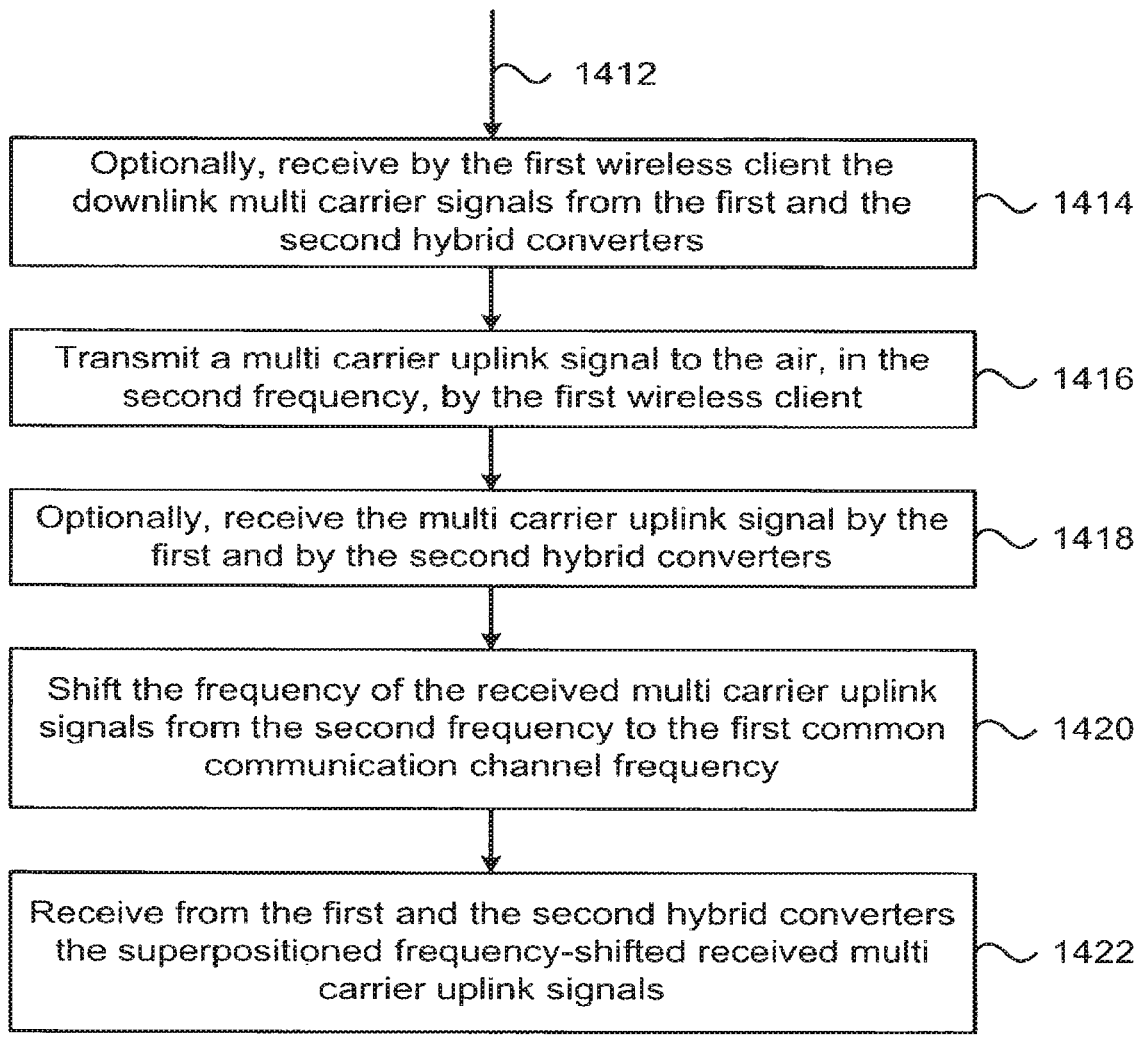

Referring back to the drawings, FIGS. 14A-14B illustrate embodiments having the following steps: In step 1402, selecting an area to be ubiquitously covered by one OFDM or OFDMA communication channel; In step 1404, setting at least two hybrid converters having an aggregated coverage area that comprises the selected area; In step 1406, connecting the hybrid converters, via a common communication channel, to a wireless point to multi point centralized synchronizing communication controller, using multi carrier signals having a first frequency; In step 1408, creating a downlink ubiquitous coverage in the selected area by transmitting from the hybrid converters approximately the same downlink multi carrier signals having a second frequency, wherein the second frequency downlink signals are at least partially overlapping and are synchronizing and bandwidth allocating a first and a second wireless clients; And in step 1410, creating an uplink ubiquitous coverage by using the at least two hybrid converters for receiving a multi carrier uplink signal transmitted by the first wireless client.

Continuing 1412 in FIG. 14B, the following optional steps are illustrated: In step 1414, receiving by the first wireless client the downlink multi carrier signals from the first and the second hybrid converters; And in step 1416, transmitting a multi carrier uplink signal to the air, in the second frequency, by the first wireless client.

Optional steps 1418, 1420, and 1422 illustrate the following: receiving the multi carrier uplink signal by the first and by the second hybrid converters; shifting the frequency of the received multi carrier uplink signals from the second frequency to the first common communication channel frequency; and receiving from the first and the second hybrid converters the superpositioned frequency-shifted received multi carrier uplink signals, via the common communication channel, by the centralized synchronizing communication controller.

Referring again to FIGS. 14A-14B, in one embodiment, the multi carrier uplink signals are modulated by OFDMA and use an amount of sub-channels that is smaller than the entire composition of the OFDMA channel. In one embodiment, the multi carrier uplink signals are modulated by OFDMA and use one sub-channel.

Referring again to FIGS. 14A-14B, in one embodiment, the common communication channel is selected from the group of: twisted pair, coax, fiber optics, and a combination thereof. In one embodiment, the common communication channel is a wireless channel. In one embodiment, the wireless clients are standard IEEE 802.16 orthogonal multi carrier modulation mobile clients.

The third set of disclosed embodiments relates to a method for implementing multiple downlink channels with a single uplink channel using a standard that inherently has one uplink channel per each downlink channel and a centralized synchronizing communication controller.

In one embodiment, broadcast MAP sections of a downlink transmission at a centralized synchronizing MAC are manipulated so that the client devices served by the point-to-multipoint system are "tricked into thinking" that a plurality of symmetrical downlink/uplink channels are at their disposal, when in fact only the multiple downlink channels are physically in existence, and the at least one uplink physical channel that exists is being used in all the uplink directions.

For clarity purposes, the terms "centralized synchronizing MAC" and "centralized synchronizing communication controller" may be used interchangeably.

In a non-limiting fashion, one embodiment of the invention may be utilized in the case of the hybrid wired-wireless point-to-multipoint communication system, as disclosed above, when the system operates on top of a CATV wired infrastructure, where downlink bandwidth is high (for example about 800 Mhz) and uplink bandwidth is limited (for example about 40 Mhz). In this case, the wireless clients may communicate with the centralized synchronizing communication controller using a standard point-to-multipoint protocol such as, but not limited to, the IEEE 802.16 as illustrated in the examples below.

The IEEE 802.16 standard is designed to be used in symmetrical uplink/downlink situations (i.e., in cases where for each distinct downlink physical channel there exists a distinct uplink physical channel). The third set of disclosed embodiments manipulates the IEEE 802.16 MAC, including the scheduler, at the centralized synchronizing communication controller level in such a way that all clients associated with the hybrid system use one common (or possibly more than one) uplink channels (for example, located in the 40 Mhz uplink band in the case of CATV) to uplink communication with the centralized synchronizing communication controller, but a plurality of downlink channels are used in the downlink. In this manner, the clients in the hybrid system enjoy a large downlink bandwidth that can include many IEEE 802.16 channels occupying (potentially) up to the entire available downlink bandwidth (about 800 Mhz in CATV, or the equivalent of 80 10 Mhz IEEE 802.16 channels).

Referring to FIG. 4A, wireless point-to-multipoint communication systems are known for many years; WiMAX (IEEE 802.16) is such a system that utilizes a frame structure, also referred to as channel, as illustrated by prior art graph 301 in FIG. 4A. Downlink MAP section 302 contains broadcasted information elements 310 and 320 that are used by the client devices to know which part of downlink payload section 304 is intended for which client (information element 310 points to payload 311, and information element 320 points to payload 321). Similarly, uplink MAP section 303 contains broadcasted information elements 330 and 340 that are used by the client devices to know which part of uplink channel section 305 is reserved for which client (information element 340 points to reservation 341, and information element 330 points to reservation 331). A standard prior art point-to-multipoint will therefore include a downlink MAP section 302, an uplink MAP section 303, a downlink payload section 304, and an uplink payload section 305; all of which being transmitted over one channel (and one frequency, in the case of a TDD systems).

The disclosed embodiments are useful in systems having the need for downlink transmission of a very large bandwidth (such as video on demand content), in which a very large downlink bandwidth is needed but only a moderate bandwidth uplink return channel is necessary and/or available. An example for such a system is the CATV.

Alternatively phrasing, in the case of CATV, signals are transmitted on the coax line at various frequencies according to the number of channels. When the signal reaches the end-point station, every transmitter converts the signal to an appropriate wireless signal. In an embodiment of the invention, the system is a TDD system wherein the client responds at the same frequency. In order to prevent collisions between different clients that are trying to transmit using the same frequency at the same time, all clients share the same uplink MAP. All hybrid converters convert their uplink data to the same uplink frequency, i.e. all hybrid converters transmit using the same uplink channel (in the case where there is only one uplink channel). The centralized synchronizing communication controller is able to assign each frame of received-uplink-data to its corresponding clients by using the uplink MAP. It is to be understood that all clients share both time and subcarriers.

In one embodiment of the invention, the system is an FDD system wherein the downlink uses a different frequency than the uplink.

Graphs 401 and 402 in FIG. 4B are schematic illustrations of the combined frame structure of multiple downlink channels with a single uplink channel as intended to be used in possible embodiments. Graphs 401 and 402 illustrate two downlink channels, and one uplink channel, but it is to be understood that the present invention can be generalized to M downlink channels over N uplink channels, where NM (the standard known case is N=M). For explanatory purposes only, FIG. 4B illustrates the case of two downlink channels.

In the illustrated example, the centralized synchronizing communication controller 7 generates two (but is not limited to two) downlink channels extending in time over 302, 303, and 304, one is shown in graph 401 and the other in graph 402; the downlink channels are transmitted on two separate frequencies over the wired distribution line 6. The first downlink channel, illustrated in graph 401, is converted by the hybrid converter 21 from the wired distribution line 6 to the wireless channel frequency 33, so that only client 50 is served by this channel (for simplicity it is assumed that each downlink channel serves only one client, but the case can be extended to any number of clients per access channel), and client 50 decodes transmission element 410 to understand that payload 411 is intended for it. Similarly, the second downlink channel, illustrated by graph 402, is converted by the hybrid converter 20 from the wired distribution line 6 to the wireless channel frequency 30, so that only client 4 is served by this channel, and it decodes the transmission element 420 to understand that the payload 421 is intended for it.

According to this embodiment, both graphs 401 and 402 have the exact same uplink MAP, so that transmission elements 430 and 440 are duplicated, such that they appear on the uplink MAP of both downlink channels. This means that the uplink channel is shared by both clients 4 and 50. Since client 4 is transmitting its uplink data 431 (pointed to by transmission element 430) on wireless channel 30, which is different from wireless channel 33 transmitted by client 50 with data 441 (pointed to by transmission element 440), it is up to hybrid converters 20 and 21 to place wireless signals 30 and 33 (carrying uplink payloads 431 and 441) on the same wired uplink channel, so that centralized synchronizing communication controller 7 receives uplink payloads 431 and 441 on uplink wired channel 305.

Similarly to FIGS. 4A and 4B, FIGS. 4C and 4D illustrate FDD channels comprising multiple downlink channels and a single uplink channel. Graph 401 is the first downlink channel having a second frequency, graph 402 is the second downlink channel having a third frequency, and illustration 403 is the first uplink channel having a first frequency. Illustration 403 is the combined uplink channels of 401 and 402.

The hybrid converter transmits to the air one downlink channel selected from the downlink channels that are transmitted over the shared signal wired distribution line. Selecting the downlink channel to be transmitted to the air may be achieved by any appropriate hybrid converter embodiment, such as, but not limited to: a hybrid converter with a predetermined channel, a hybrid converter with a pre-set channel, and/or a hybrid converter with a channel selector.

The above-described third set of disclosed embodiments is capable of transmitting multiple downlink channels with at least one return uplink channel to standard 802.16 OFDM or OFDMA clients. This method is useful in hybrid system situations where downlink bandwidth is high, and uplink bandwidth is low, like in the case of CATV wired infrastructure.

It is to be understood that the third set of disclosed embodiments can be extended to at least one uplink channel with multiple downlink channels, provided that there are more downlink channels than uplink channels. This is advantageous for each shared media and for each network where everyone receives from everyone. FDD is a common medium system of multiple downlink channels sharing a single uplink channel.

Figure 15:
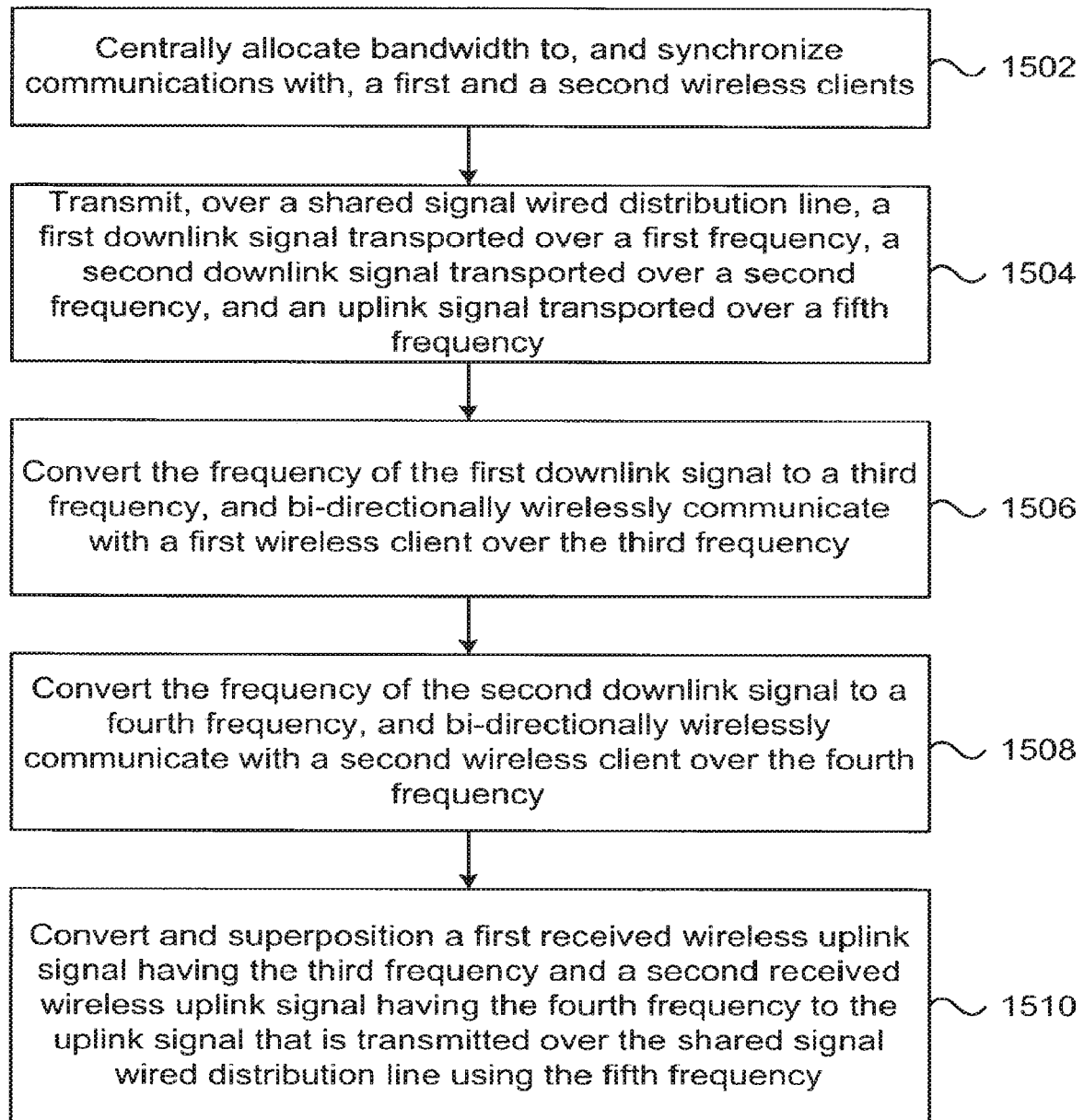

Referring back to the drawings, FIG. 15 illustrates a method for communicating with a first and a second wireless client having the following steps: In step 1502, centrally allocating bandwidth to, and synchronizing communications with a first and a second wireless client; In step 1504, transmitting, over a shared signal wired distribution line, a first downlink signal transported over a first frequency, a second downlink signal transported over a second frequency, and an uplink signal transported over a fifth frequency; In step 1506, converting the frequency of the first downlink signal to a third frequency, and bi-directionally wirelessly communicating with a first wireless client over the third frequency; In step 1508, converting the frequency of the second downlink signal to a fourth frequency, and bi-directionally wirelessly communicating with a second wireless client over the fourth frequency; And in step 1510, converting and superimposing a first received wireless uplink signal having the third frequency and a second received wireless uplink signal having the fourth frequency to the uplink signal that is transmitted over the shared signal wired distribution line using the fifth frequency.

Referring again to FIG. 15, in one embodiment, the step of converting and superimposing the first and the second received wireless uplink signals to the uplink signal having the fifth frequency is performed by using a first and a second hybrid converter, respectively. In one embodiment, the uplink signal is a combined signal resulting from a superimposing of the fifth frequency signal coming from the first hybrid converter, and the fifth frequency signal coming from the second hybrid converter.

Referring again to FIG. 15, one embodiment further features the optional steps of: converting the first frequency of the first downlink signal to the third frequency by using the first hybrid converter; and converting the second frequency of the second downlink signal to the fourth frequency by using the second hybrid converter.

Referring again to FIG. 15, in one embodiment, the first and the second hybrid converters have at least partially overlapping coverage areas and the first wireless client is located in the overlapping coverage area.

Referring again, to FIG. 15, in one embodiment, the signals are OFDM or OFDMA signals. In one embodiment, the step of centrally allocating bandwidth and synchronizing communications comprises the use of a MAC used by an IEEE 802.16 orthogonal multi carrier modulation. In one embodiment, the wireless clients are standard IEEE 802.16 orthogonal multi carrier modulation mobile clients. In one embodiment, the first received wireless uplink signal and the second received wireless uplink signal are modulated by OFDMA and each of the signals uses an amount of sub-channels that is smaller than the entire composition of the OFDMA channel. In one embodiment, the first received wireless uplink signal and the second received wireless uplink signal are modulated by OFDMA and each of the signals uses one sub-channel.

The fourth set of disclosed embodiments relates to a filtering process to enhance uplink reception sensitivity in OFDMA hybrid wired-wireless point to multipoint communication systems.

The fourth set of disclosed embodiments is better understood and will become apparent to one ordinarily skilled in the art upon examination of the following description, which together with the accompanying drawings, illustrate the present invention in a non-limiting fashion.

The disclosed uplink OFDMA filtering process may resolve the thermal noise buildup problem in the uplink channel of hybrid wired-wireless point to multipoint communication systems. The thermal noise buildup problem is caused by the simultaneous transmission of multiple hybrid converters in uplink direction 111.

For example, in a 10 Mhz channelization IEEE 802.16e transmission, each converter adds its 10 Mhz thermal noise to the overall noise picked by the receiver of centralized synchronizing communication controller 7, so that the total sensitivity of centralized synchronizing communication controller 7 is degraded by the amount of: 10*log [Number of hybrid Converters per uplink channel] dB.

This effect may cause the downlink and uplink directions to be asymmetrical in terms of sensitivity, which is usually unwanted. The embodiment of the hybrid system, and other communication systems, are designed to support bi-directional communication and therefore should have symmetrical sensitivity.

The filtering process is useful for the OFDMA uplink channel, where multiple users transmit simultaneously on the same uplink channel by using different sub-carrier groups within the channel. Each group is allocated on a symbol-by-symbol basis to a specific user (the sub-carrier groups are also called sub-channels).

In one embodiment, the filter is placed at the hybrid converter transmission side, and is basically blocking the non-active sub-carriers (i.e., the carriers that carry only thermal noise with no signal), so that only information-carrying sub-carriers are relayed up to the centralized synchronizing communication controller. The result is that no excess thermal noise builds up at the centralized synchronizing communication controller receiver side.

In one embodiment, each hybrid converter has its own wired distribution line, as illustrated in FIG. 1C. In this case, the filters may be placed in a central location, for example before the superposition of the signals at 6*b*.

Since in most OFDMA wireless standards (such as the IEEE 802.16e PUSC mode), the sub-carriers are pseudo-randomly distributed across the channel (for spectral diversity purposes), the blocking of non-information carrying sub-carriers within the uplink channel requires a filtering that is performed at the individual sub-carrier level, and this is what the disclosed filtering process does.

Alternatively phrasing, when there are many hybrid converters that can perform up and down frequency conversion without having the ability to upload only real data, the centralized synchronizing communication controller may receive a signal that features a low SNR, due to the fact that the noise from the multiple hybrid converters may be summed up to a significant noise. In one embodiment of the present invention, the hybrid converters include a filter and therefore are able to filter out the thermal noise. The following two non-limiting examples enable the hybrid converter to filter out the noise:

(a) The hybrid converter performs an FFT and, if the result per carrier is bigger than a predefined threshold, the received signal is uploaded. Otherwise, the received signal is filtered out.

(b) all the sub-carriers that belong to the same sub-channel of a specific packet are taken and it is checked whether the sum of all sub-channels passes a predefined threshold or not. If the sum of all sub-channels passes a predefined threshold, the data is uploaded from all the sub-channels that belong to the user. Otherwise, all the sub-channels are filtered out, even if there are a few sub-channels which are stronger than the threshold.

In another embodiment of the invention, it is not necessary to know with which client the system is communicating because the groups of sub-channels are known and defined in the protocol. In the case where there are a number of possible combinations of the sub-channels, all possibilities are checked and those that pass the threshold are transmitted.

Figure 6:
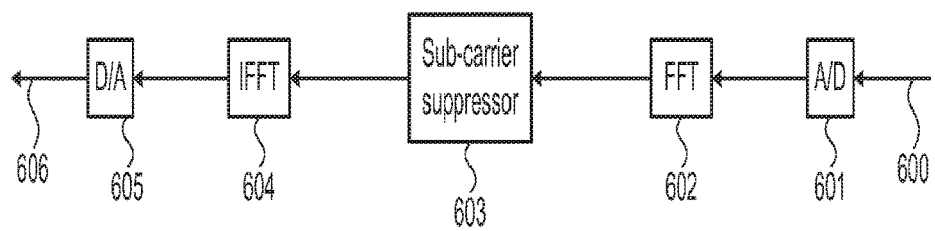
FIG. 6 is a schematic diagram illustrating an uplink OFDMA thermal noise buildup filter, in accordance with one embodiment of the present invention.

FIG. 6 is a schematic block diagram illustrating the sub-carrier level filtering process, which may be performed at the hybrid converter uplink transmission path. The filter may be located before Band Pass Filter (BPF) 501 as an example. The signal from hybrid converter antenna 600 is down converted to Baseband (BB), and sampled by A/D 601 to be processed by an FFT block 602. Optionally, the FFT size is in accordance to the number of sub-carriers supported by the OFDMA uplink channel, so that each bin of FFT block 602 output represents a sub-carrier in the uplink OFDMA channel. The resultant FFT bins are sent to a sub-carrier suppressor block 603 (on a per time symbol basis), where they are processed to determine which bins (sub-carriers) will be relayed to the centralized synchronizing communication controller 7 (carrying information), and which bins are blocked (carrying thermal noise and no information). The bins that carry information are sent to IFFT block 604 for reconstruction of the time domain uplink channel, and are converted back to analog form by D/A 605. The resulting reconstructed signal 606 is passed on for uplink transmission.

Suppressor block 603 may employ one of the following blocking algorithms as a non-limiting example (and without limiting the generality of the disclosed sub-carrier level filtering process): (a) Define a predetermined power level threshold, and block each sub-carrier that is below the predetermined power level. (b) Integrate the power of each sub-carrier group (sub-channel), and block entire groups if the integrated power is below the predetermined power level.

It is to be noted that the disclosed uplink filtering process was described in the context of the hybrid communication system of the present invention, but can be similarly employed in uplink OFDMA non-regenerative wireless-to-wireless relays, or in any other uplink system in which multiple OFDMA relays (converters) are being used in parallel on the same uplink channel.

The above-described fourth set of disclosed embodiments is capable of creating a filtering process for any communication system that employs multiple uplink relays, also referred to as converters, that operate over a common uplink OFDMA channel. The disclosed filtering process solves the uplink thermal noise buildup associated with uplink channel of such systems, so that the reception sensitivity of the centralized synchronizing communication controller is kept at its theoretical level, regardless of the number of deployed relays.

For example, the disclosed filtering process may be used with OFDMA IEEE 802.16e (WiMAX) hybrid communication systems that are working in a simulcast mode, where many hybrid converters share the same uplink channel.

Referring back to the drawings, FIG. 16A illustrates embodiments having the following steps: In step 1602, determining transmission synchronization and bandwidth allocation for a plurality of wireless clients; In step 1604, communicating with the wireless clients via a plurality of hybrid converters connected to a shared signal distribution line, by using a wireless point to multi point centralized synchronizing communication controller and an OFDMA modulation; In step 1606, receiving wireless upload transmission by using the hybrid converters; And in step 1608, blocking non-information carrying sub-carriers, received by at least one of the hybrid converters, before superimposing the received wireless upload transmissions on the shared signal distribution line.

Referring again to FIG. 16A, in one embodiment, the shared signal distribution line is a shared signal wired distribution line, and the hybrid converters are shifting the frequency of the received upload transmissions from a wireless frequency to a wired communication line frequency. In one embodiment, the shared signal wired distribution line is selected from the group of: twisted pair, coax, fiber optics, and a combination thereof.

Referring again to FIG. 16A, in one embodiment, the shared signal distribution line is a shared signal wireless distribution line and the hybrid converters are shifting the frequency of the received upload transmissions from a first wireless frequency to a second wireless frequency. In one embodiment, the wireless clients are standard IEEE 802.16 orthogonal multi carrier modulation mobile clients. In one embodiment, the wireless point to multi point centralized synchronizing communication controller comprises a MAC used by an IEEE 802.16 orthogonal multi carrier modulation. In one embodiment, the upload transmission uses an amount of sub-channels that is smaller than the entire composition of the OFDMA channel. In one embodiment, the upload transmission uses one sub-channel.

Referring back to the drawings, FIGS. 16B-16C illustrate two examples of implementing step 1608 of blocking non-information carrying sub-carriers.

In FIG. 16B, the following steps are illustrated: In step 1610, performing an FFT; In step 1612, suppressing signals below a predefined threshold according to a per-carrier examination; And in step 1614, performing an IFFT.

In FIG. 16C, the following steps are illustrated: In step 1610, performing an FFT; In step 1616, suppressing sub-channels that do not belong to a predefined user according to sub-channel examination; In step 1618, suppressing sub-channels that do not pass a predefined threshold according to sub-channel examination; And in step 1614, performing an IFFT.

Referring again to FIG. 16A, in one embodiment, at least two of the hybrid converters have at least partially overlapping coverage areas and at least one wireless client is located in the overlapping coverage area.

One embodiment further comprises the steps of receiving by the at least one wireless client a superposition of transmissions from the at least two hybrid converters; and transmitting an upload transmission to the air by the wireless client.

The fifth set of disclosed embodiments relates to a method of simultaneous transmitting of simulcast and single cast information over a single point to multipoint communication channel created by an embodiment of the hybrid system of the present invention.

The formed wireless access fields may feature different dimensions and/or contain other wireless access fields. The embodiments enable changing the wireless access field dimensions in a dynamic manner. By using the disclosed hybrid converters, it is possible to create virtually any required wireless access fields division. Moreover, if a wireless access field within another wireless access field is desired, then the same hybrid converter may transmit in at least two different frequencies.

A simultaneous transmitting of simulcast and single cast information over a single point to multipoint communication channel uses a single point to multipoint channel in such a way that a common access field cloud (as described above, also known as simulcasting) is formed over a group of hybrid converters, but at the same time the same point to multipoint channel is also used to enable each of the hybrid converters in the simulcast group (or sub-groups within the group) to support single casting operation (meaning that each converter transmits/receives information that is not shared with the rest of the group).

Moreover, the disclosed simultaneous simulcasting/single casting over a shared channel, enables the hybrid communication system of the present invention, or other hybrid communication systems, to use the same transmission/reception hardware to do both simulcasting and single casting.

Figure 9A:
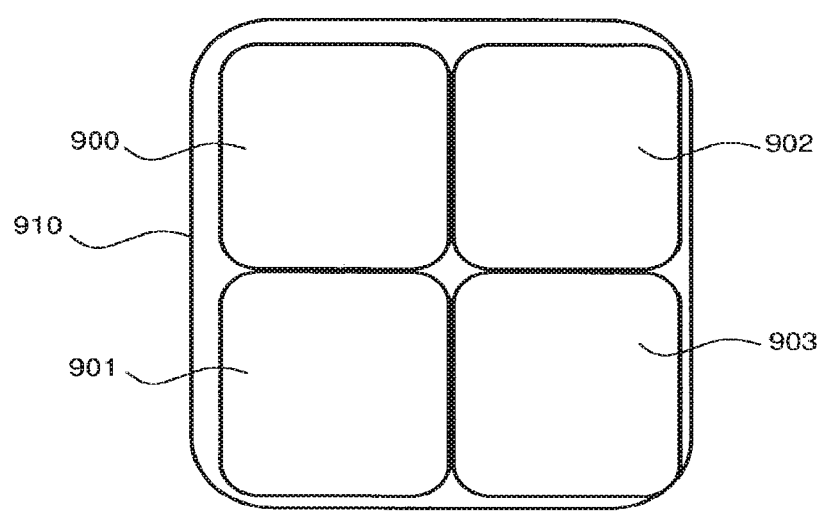
FIGS. 9A-B are schematic illustrations of the formation of wireless access fields featuring different dimensions, in accordance with one embodiment of the present invention.

Referring to FIG. 9A, each small wireless access field 900, 901, 902, 903, represents a different access field sub-grouping, which all hybrid converters transmit, in addition, in the frequency, or time domain, of the larger wireless access field 910. Optionally, mobile users communicate with large access field 910 and the stationary users, which need a wide bandwidth, communicate with the appropriate frequencies, or time domains, in the smaller wireless access fields 900, 901, 902, 903.

It is to be understood that the meaning of implementing STC with the disclosure of the present invention results in dividing the stations between the two scrambled series.

In the case where there is a large access field and it is desired to divide it into several smaller access fields, an embodiment of the present invention introduces the benefit of no need to add hybrid converters. It is only necessary to add the appropriate MAC and RF front-end in the centralized synchronizing communication controller.

Herein disclosed are several examples of methods for dividing the access fields by using the hybrid converters which are available in the area, and the required changes on the centralized synchronizing communication controller:

(a) the number of up and down converting elements is multiplied by the number of access fields to be created. In this case, the centralized synchronizing communication controller transmits one common channel and a few private channels, therefore if there are 'n' private channels, the centralized synchronizing communication controller should have (n+1) PHY and MAC elements. This option is simple to implement from an engineering standpoint.

(b) the number of units (each featuring an up-converter, a down-converter and an antenna), at each hybrid converter, is increased. Using that configuration, in order to add an additional channel, an additional unit is added. In this case, for TDD there is a need to synchronize the different access fields. This may be done by adding a MAC & PHY for each channel and synchronizing the different channels by using the appropriate software in the centralized synchronizing communication controller, wherein the software schedules when the relay is in which access field.

(c) using TDD and an up converter that moves fast between the different intermediate frequencies (IFs). The up converter is synchronized with the frequency of the channel that has to be transmitted. In this case, a "Super MAC" is used for synchronizing the different MACs to have a common channel. This is done at the scheduler level that coordinates the insertion of the common channel among the different channels.

(d) using sub-channels for creating both common access zones and private access zones, using one channel. In OFDMA there are sub-channels and the extraction of the sub-channel is part of the standard.

In one embodiment, in order to ensure that the SFN access field is created at the same time, the common channels of all of the contributors are located in the same sub-channel and on the same time. It should be noted that using the SFN reduces the bandwidth that is allocated to each application. As a result, this method is particularly applicable to applications that do not require a wide bandwidth. The percent of the bandwidth allocated to each application depends on the application attributes, requirements, and desired objectives.

The IEEE 802.16 standard defines time-frames for transmitting the MAP (i.e. who transmits, who receives, and when). In one embodiment, the MAP is a means for synchronization. The MAP may be implemented by a broadcast to which all users listen. According to one embodiment, it is advantageous to transmit the MAP in a manner that all pointers that are pointing to common areas are in the same location in the MAP. Therefore, it does not matter from where a MAP is being received; it is always possible to synchronize on the common area. In the case when pointers are pointing to exclusive areas, every access field has different information for each sub-access field.

The fifth set of disclosed embodiments is better understood and will become apparent to one ordinarily skilled in the art upon examination of the following two methods for transmitting simulcast and single cast information simultaneously over a single point to multipoint channel, as disclosed hereinbelow, which together with the description and accompanying drawings, illustrate the embodiments of the present invention in a non-limiting fashion. The first method utilizes OFDMA sub-channelization, and the second method utilizes OFDM/OFDMA time division.

Reference is now made to the following method for transmitting simulcast and single cast information simultaneously over a single point to multipoint channel by utilizing OFDMA sub-channelization.

Figure 7:
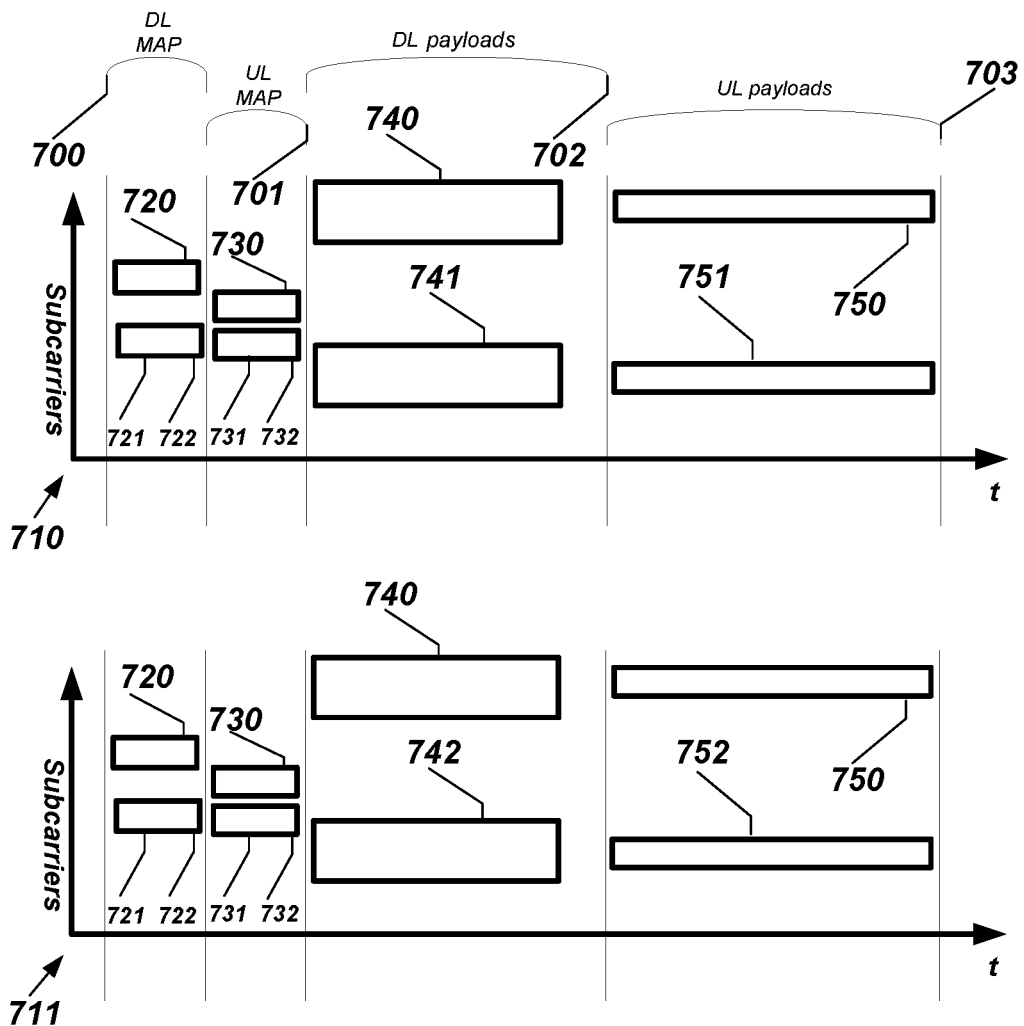
FIG. 7 is a schematic illustration of combining simulcast and single cast in the same OFDMA channel by the utilization of sub-channelization, in accordance with one embodiment of the present invention.

FIG. 7 is a schematic illustration of combining simulcast and single cast in the same OFDMA channel by the utilization of sub-channelization. Channel 710 is transmitted to and/or received from one transmitter (the transmitter may be, but is not limited to, a hybrid converter 20 for example), and channel 711 is transmitted to and/or received from a second transmitter (the transmitter may be, but is not limited to, a hybrid converter 21 for example). It is to be understood that the example is not limited to two transmitting/receiving elements 20, 21, and can be similarly used for any number of such elements. MAP regions 700 and 701 of both channels 710 and 711 include identical information elements 720, 721, 722, 730, 731, 732, that act as pointers for transmission/reception scheduling of the wireless clients, but only downlink payload 740 (that is pointed to by information element 720) is shared by both channels 710 and 711 (and therefore transmitted from both converters 20 and 21 in this example), whereas downlink payload 741 (pointed to by information element 721) is transmitted only with channel 710 (and therefore only by converter 20 in this example) and downlink payload 742 (pointed to by information element 722) is transmitted only with channel 711 (and therefore only by converter 21 in this example). Since payload 740 is shared by both converters 20 and 21, and it occupies the identical sub-channels in both of the point to multipoint OFDMA channels 710 and 711, it is effectively being simulcasted. Since payload 741 is transmitted only by the converter 20, it will be picked by users that are in close proximity to that converter only, and similarly payload 742 is transmitted only by converter 21, and will be picked by users that are in close proximity to that converter only. Payloads 741 and 742 are transmitted over the same spectrum (the same sub-channels within the main channel frequency), but are received separately by, for example, client 4 and client 50, since 4 is close to 20 and 50 is close to 21. Both clients 4 and 50 are able to decode payload 740, since it is simulcasted.

As seen, the separation between information that is simulcast and information that is single cast may be done at the frequency sub-channel level, which is a feature of point to multipoint OFDMA systems. The same technique may also be used in the uplink direction, so that the uplink payload 750 (pointed to by the information element 730) is received, for example, by the centralized synchronizing communication controller 7 from both converters 20 and 21, whereas payloads 751 and 752 (pointed to by information elements 731 and 732 respectively) are received separately from converters 20 and 21 (respectively), and contain different information.

It is noted that in the above example, two chunks of sub-channels are used, but any number of sub-channel separations may be used, as is indeed possible by communication techniques like, but not limited to, IEEE 802.16e OFDMA.

Reference is now made to the following method for transmitting simulcast and single cast information simultaneously over a single point to multipoint channel by utilizing OFDM and/or OFDMA time division.

Figure 8:
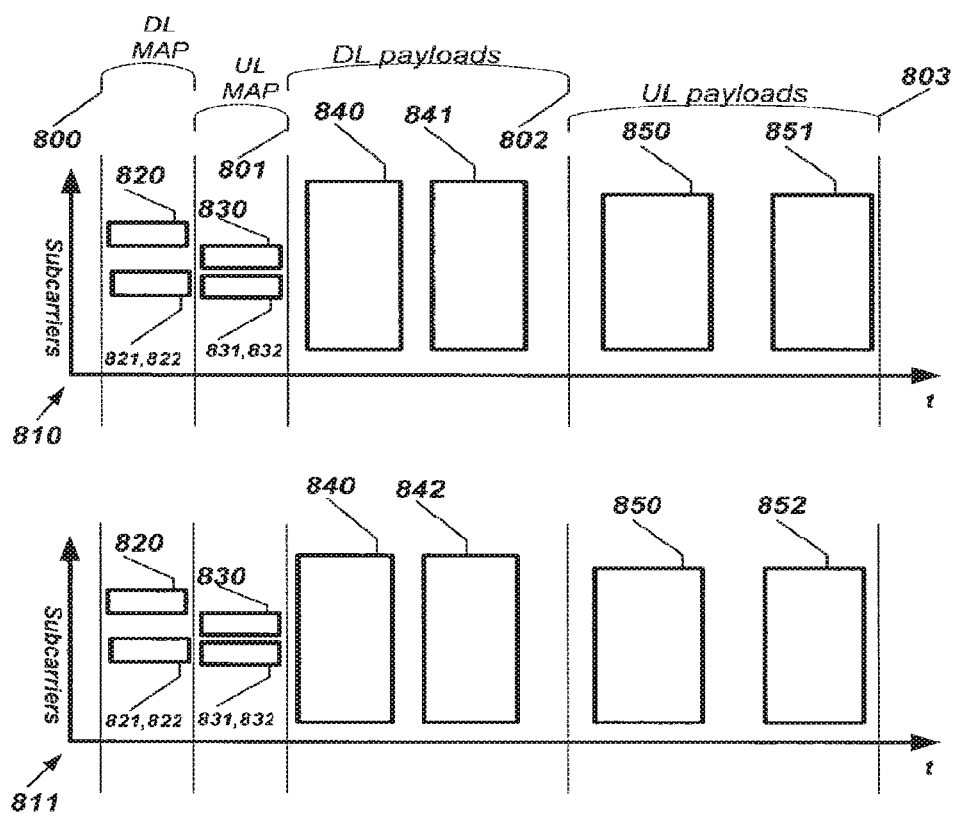
FIG. 8 is a schematic illustration of combining simulcast and single cast in the same OFDM/OFDMA channel by the utilization of time division, in accordance with one embodiment of the present invention.

FIG. 8 is a schematic illustration of combining simulcast and single cast in the same OFDM/OFDMA channel by the utilization of time division. Channel 810 is transmitted to and/or received from a first transmitter (the transmitter may be, but is not limited to, a hybrid converter 20, for example), and channel 811 is transmitted to and/or received from a second transmitter (the transmitter may be, but is not limited to, a hybrid converter 21, for example). It is noted that the example is not limited to two transmitting and/or receiving elements 20 and 21, and can be similarly used for any number of such elements. MAP regions 800 and 801 of both channels 810 and 811 include identical information elements 820, 821, 822, 830, 831, and 832 that act as pointers for transmission/reception scheduling of the wireless clients, but only downlink payload 840 (that is pointed to by information element 820) is shared by both channels 810 and 811 (and therefore transmitted from both converters 20 and 21 in this example), whereas downlink payload 841 (pointed to by information element 821) is transmitted only with channel 810 (and therefore only by converter 20 in this example) and downlink payload 842 (pointed to by information element 822) is transmitted only with channel 811 (and therefore only by converter 21 in this example). Since payload 840 is shared by both converters 20 and 21, and occupies identical time tags in both of the point to multipoint OFDM or OFDMA channels 810 and 811, it is effectively being simulcasted. Since payload 841 is transmitted only by converter 20, it will be picked by users that are in close proximity to that converter, and similarly payload 842 is transmitted only by converter 21, and will be picked by users that are in close proximity to that converter. Payloads 841 and 842 are transmitted over the same time (the same time symbols within the main channel), but are received separately by, for example, client 4 and client 50, since 4 is close to 20 and 50 is close to 21. Both clients 4 and 50 are able to decode payload 840, since it is simulcasted.

As seen, the separation between information that is simulcast and information that is single cast may be done at the time division level. The same technique may also be used in the uplink direction, so that the uplink payload 850 (pointed to by the information element 830) is received by the centralized synchronizing communication controller 7 (as a non-limiting example) from both converters 20 and 21, whereas payloads 851 and 852 (pointed to by information elements 831 and 832 respectively) are received separately from converters 20 and 21 (respectively), and contain different information.

It is to be noted that in the above example, two chunks of time-symbols are used as an example, but any number of time-symbol separations may be used—as is indeed possible by communication techniques such as, but not limited to, IEEE 802.16e, or IEEE 802.11. Moreover, it is to be understood that above described features of the invention, which are, for clarity, described in the context of separate embodiments, may also be provided in various combinations in a single embodiment. For example, a combination of sub-channelization and time division separation between simulcasting and single casting over the same OFDMA channel may be employed.

The above-described fifth set of disclosed embodiments is capable of combining both simulcasting and single casting information over the same point to multipoint channel and using multiple Tx/Rx sources. The disclosed embodiments allow using the same hardware elements to deliver both a ubiquitous coverage cloud over the sum of all covered areas by all Tx/Rx sources, and dedicated per Tx/Rx source information, that allow using high bandwidth transmissions and using very efficient frequency reuse factors.

Moreover, it is to be noted that the fifth set of disclosed embodiments is very well suited for usage with the hybrid point to multipoint communication systems, as described above in the first and the second sets of disclosed embodiments.

An example of where simulcast/single cast separation over one channel may be used is in systems where both a large area of continuous coverage is needed (for example, for mobile voice applications), and at the same time a very local and high bandwidth is needed for nomadic clients (for example, streaming to laptops). Without limiting the scope of the invention, in one embodiment of the invention, WiMAX IEEE 802.16e may be used for implementing the disclosed method of the present invention.

The private channels' coverage areas are characterized by the fact that a private signal having a first coverage area does not interfere with a second private signal having a second coverage area.

a client that is in close proximity to a converter may be assigned to a private channel or to the common channel. A client that is not in one of the private channels may be assigned only to the common channel.

Assigning the clients to the common or to the private channels may be performed dynamically and/or a-priori in a static manner. For example, a client may be manually located and assigned to a private or common channel. Alternatively, the centralized synchronizing communication controller may scan the available private channels in order to map the clients and determine the possible channel assignments.

Figure 9B:
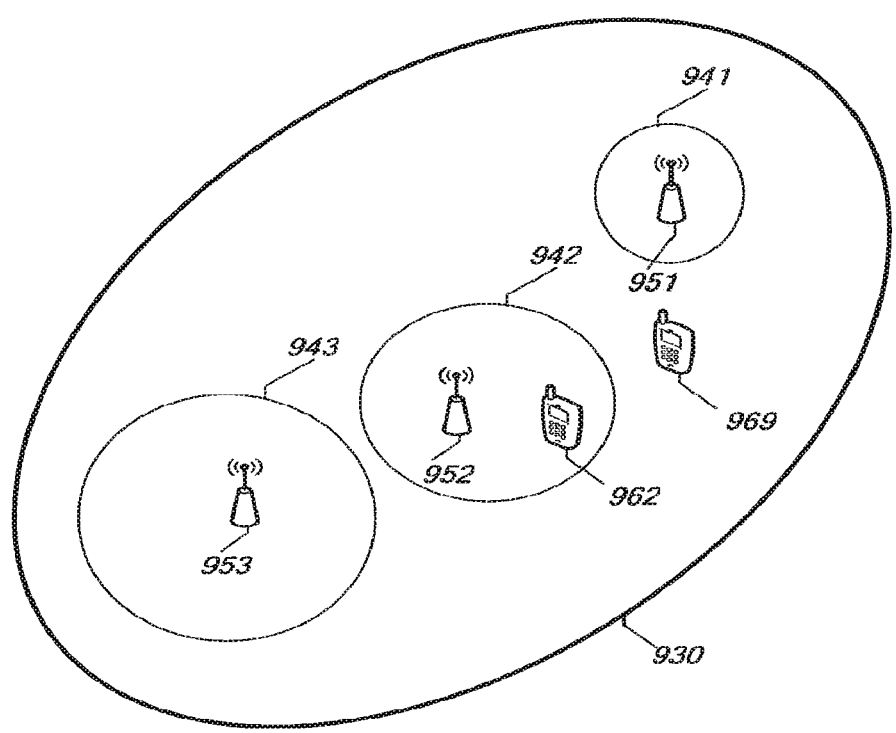

FIG. 9B illustrates three hybrid converters 951, 952, and 953; Each hybrid converter features a private coverage area, referred to as 941, 942 and 943 correspondingly. The communication system features a common coverage area 930. Wireless client 969 is able to communicate over the common channel 930 while wireless client 962 is able to communicate either over the common channel 930 or over private channel 942.

Figure 17A:
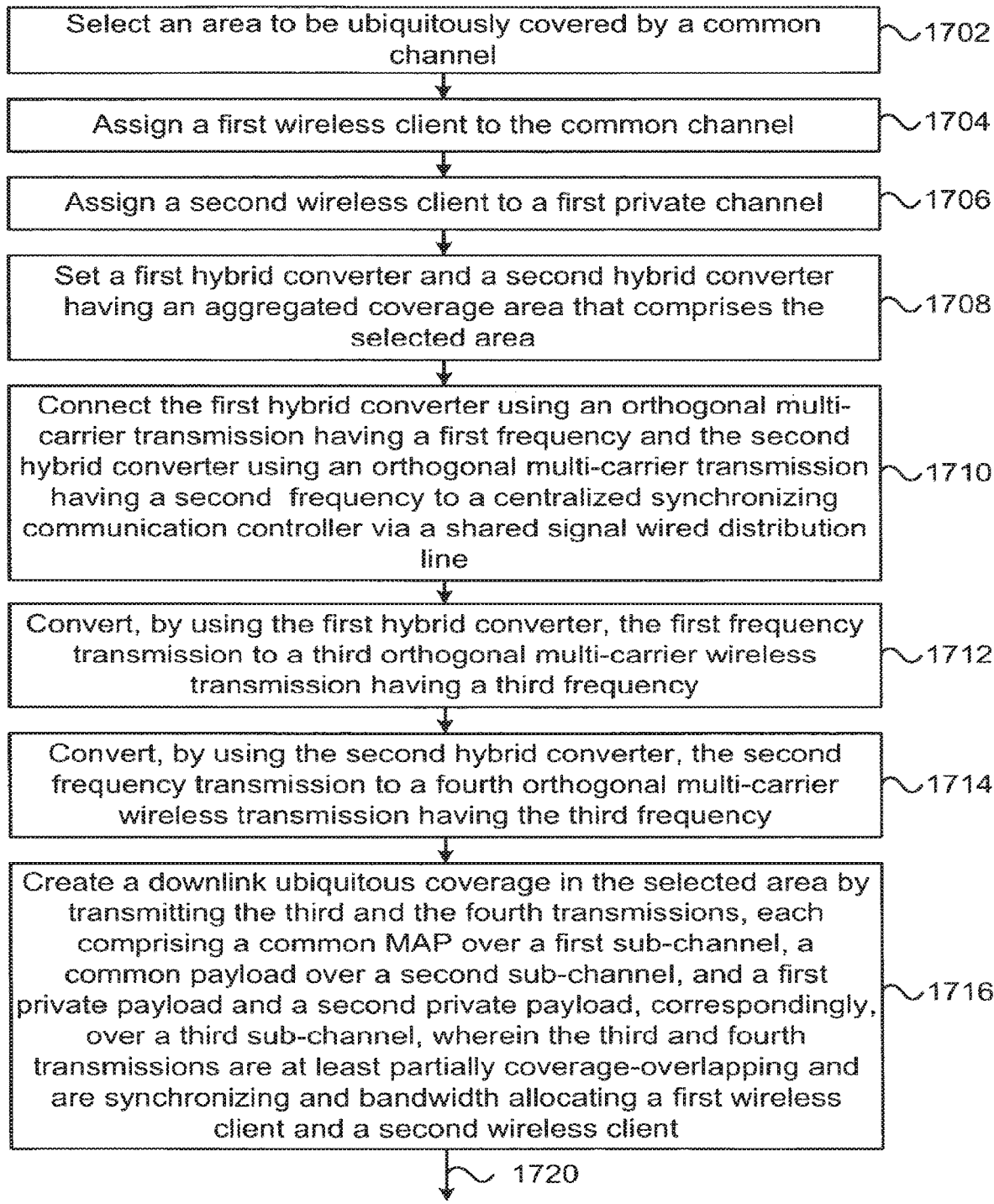
Figure 17B:
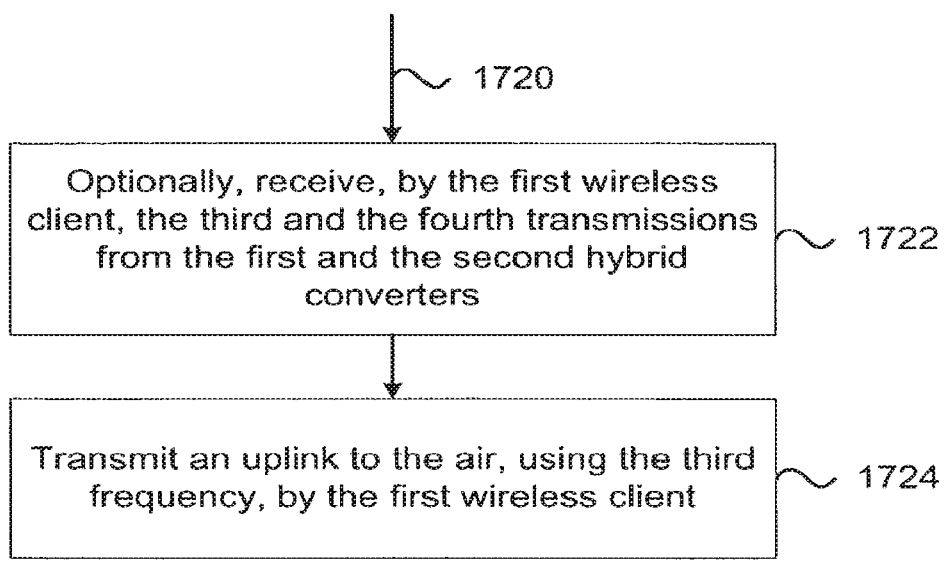
Figure 17C:
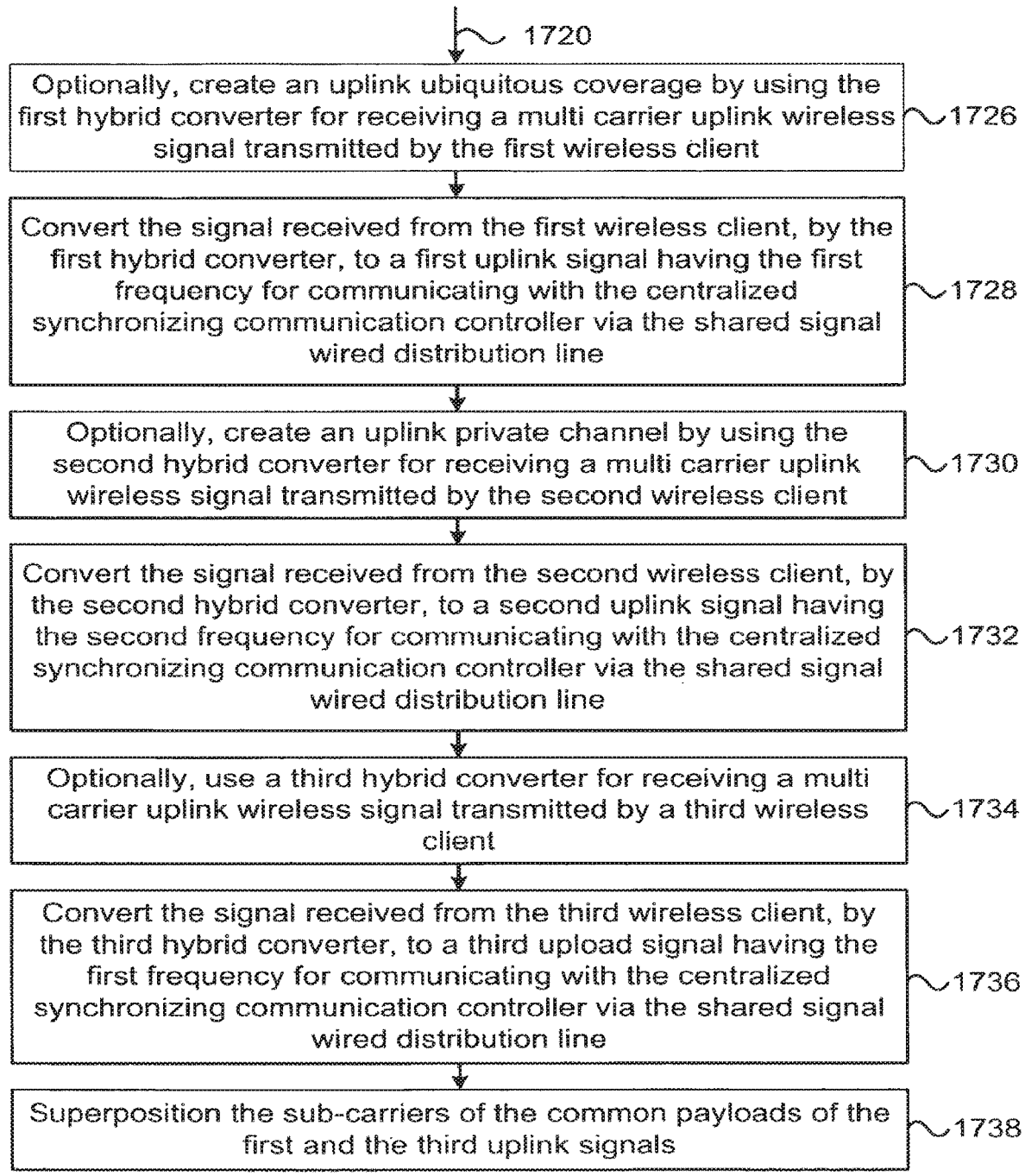

Referring back to the drawings, FIGS. 17A-17C illustrate embodiments having the following steps: In step 1702, selecting an area to be ubiquitously covered by a common channel; In step 1704, assigning a first wireless client to the common channel; In step 1706, assigning a second wireless client to a first private channel; In step 1708, setting a first hybrid converter and a second hybrid converter having an aggregated coverage area that comprises the selected area; In step 1710, connecting the first hybrid converter using an orthogonal multi-carrier transmission having a first frequency and the second hybrid converter using an orthogonal multi-carrier transmission having a second frequency to a centralized synchronizing communication controller via a shared signal wired distribution line; In step 1712, converting, by using the first hybrid converter, the first frequency transmission to a third orthogonal multi-carrier wireless transmission having a third frequency; In step 1714, converting, by using the second hybrid converter, the second frequency transmission to a fourth orthogonal multi-carrier wireless transmission having the third frequency; And in step 1716, creating a downlink ubiquitous coverage in the selected area by transmitting the third and the fourth transmissions, each comprising a common MAP over a first sub-channel, a common payload over a second sub-channel, and a first private payload and a second private payload, correspondingly, over a third sub-channel, wherein the third and fourth transmissions are at least partially coverage-overlapping and are synchronizing and bandwidth allocating a first wireless client and a second wireless client.

Continuing 1720 in FIG. 17B, the following optional steps are illustrated: In step 1722, receiving, by the first wireless client, the third and the fourth transmissions from the first and the second hybrid converters; And in step 1724, transmitting an uplink to the air, using the third frequency, and according to the received synchronization and bandwidth allocation, by the first wireless client.

Referring again to FIGS. 17A-17B, one embodiment further comprises modulating the uplink by OFDMA and using an amount of sub-channels that is smaller than the entire composition of the OFDMA channel. One embodiment further comprises modulating the uplink by OFDMA and using one sub-channel.

Continuing 1012 in FIG. 17C, the following optional steps are illustrated: In step 1726, creating an uplink ubiquitous coverage by using the first hybrid converter for receiving a multi carrier uplink wireless signal transmitted by the first wireless client; and in step 1728, converting the signal received from the first wireless client, by the first hybrid converter, to a first uplink signal having the first frequency for communicating with the centralized synchronizing communication controller via the shared signal wired distribution line.

Continuing in FIG. 17C, the following optional steps are illustrated: In step 1730, creating an uplink private channel by using the second hybrid converter for receiving a multi carrier uplink wireless signal transmitted by the second wireless client; And in step 1732, converting the signal received from the second wireless client, by the second hybrid converter, to a second uplink signal having the second frequency for communicating with the centralized synchronizing communication controller via the shared signal wired distribution line.

Continuing in FIG. 17C, the following optional steps are illustrated: In step 1734, using a third hybrid converter for receiving a multi carrier uplink wireless signal transmitted by a third wireless client; In step 1736, converting the signal received from the third wireless client, by the third hybrid converter, to a third upload signal having the first frequency for communicating with the centralized synchronizing communication controller via the shared signal wired distribution line; And in step 1738, superimposing the sub-carriers of the common payloads of the first and the third uplink signals.

Referring again to FIG. 17C, in one embodiment, the step of superimposing the sub-carriers is performed by using the centralized synchronizing communication controller.

Referring again to FIG. 17A, in one embodiment, the shared signal wired distribution line is selected from the group of: twisted pair, coax, fiber optics, and a combination thereof. In one embodiment, the orthogonal multi-carrier transmissions are OFDM or OFDMA transmissions. In one embodiment, the centralized synchronizing communication controller further comprises a MAC used by an IEEE 802.16 orthogonal multi carrier modulation. In one embodiment, the wireless clients are standard IEEE 802.16 orthogonal multi carrier modulation mobile clients.

Referring back to the drawings, FIGS. 18A-18E illustrate a method for communicating with a first and a second wireless clients via a point to multipoint shared signal wired distribution line having the following steps: In step 1802, transmitting to a first hybrid converter a first transmission having a first frequency; transmitting to a second hybrid converter a second transmission having a second frequency, wherein the first transmission and the second transmission are orthogonal multi-carrier modulation signals comprising a common MAP over a first sub-channel, a common payload over a second sub-channel; and the first transmission further comprising a first private payload and the second transmission further comprising a second private payload, correspondingly, over a third sub-channel; In step 1804, converting, by using the first hybrid converter, the first transmission to a third wireless transmission having a third frequency; In step 1806, converting, by using the second hybrid converter, the second transmission to a fourth wireless transmission having the third frequency; And in step 1808, wirelessly transmitting the third transmission and the fourth transmission for communicating with the first and the second wireless clients.

Figure 18A:
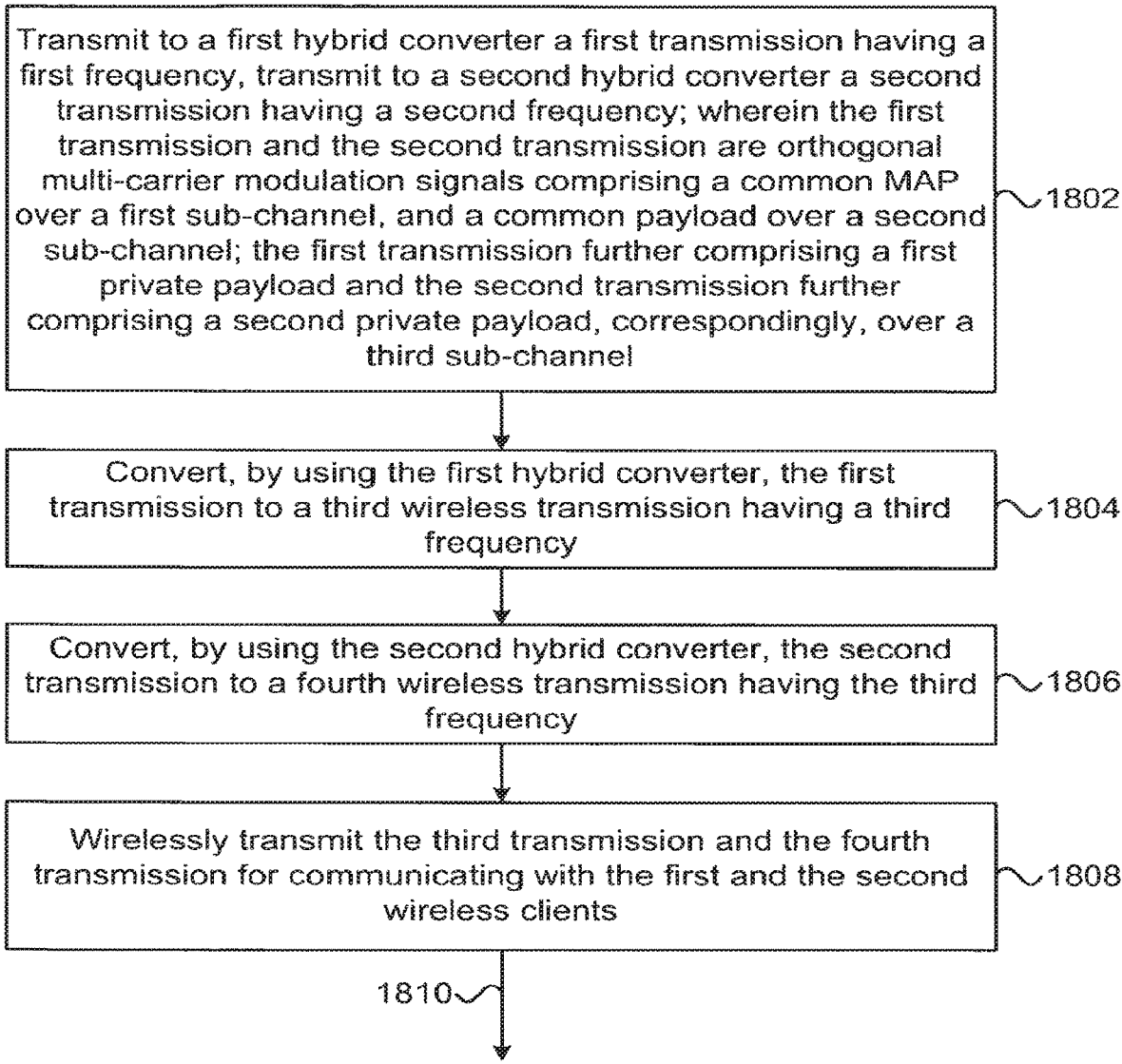
Figure 18B:
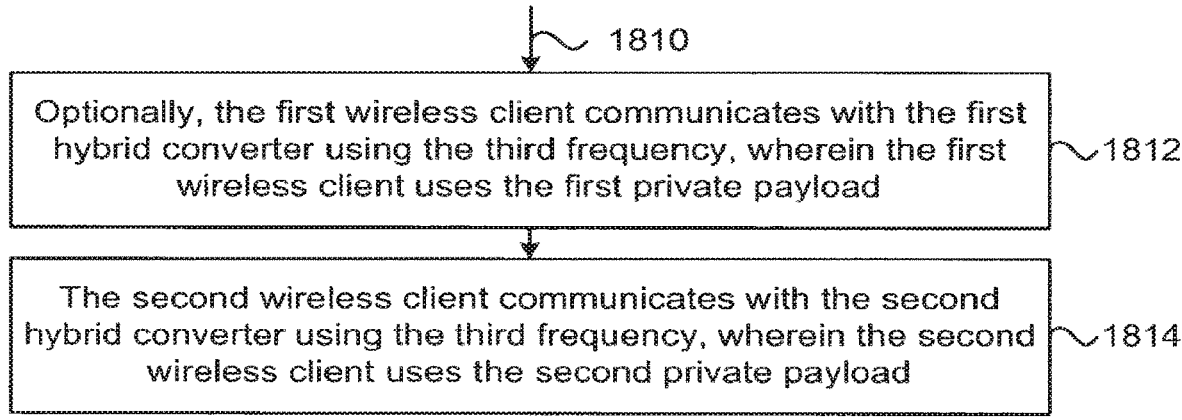

Continuing 1810 in FIG. 18B, the following optional steps are illustrated: In step 1812, the first wireless client communicates with the first hybrid converter using the third frequency, wherein the first wireless client uses the common payload; And in step 1814, the second wireless client communicates with the second hybrid converter using the third frequency, wherein the second wireless client uses the second private payload.

Referring again to FIG. 18A, one embodiment further comprises the step of the first wireless client communicating with the first hybrid converter using the third frequency, wherein the first wireless client uses the first private payload; and the second wireless client communicating with the second hybrid converter using the third frequency, wherein the second wireless client uses the second private payload.

Referring again to FIG. 18A, in one embodiment, the first and the second wireless clients are standard IEEE 802.16 orthogonal multi carrier modulation clients. In one embodiment, the first, second and third sub-channels are standard IEEE 802.16 orthogonal multi carrier modulation sub-channels. In one embodiment, the shared signal wired distribution line is selected from the group of: twisted pair, coax, fiber optics, and a combination thereof. In one embodiment, the orthogonal multi-carrier modulation signals are OFDM or OFDMA signals.

Figure 18C:
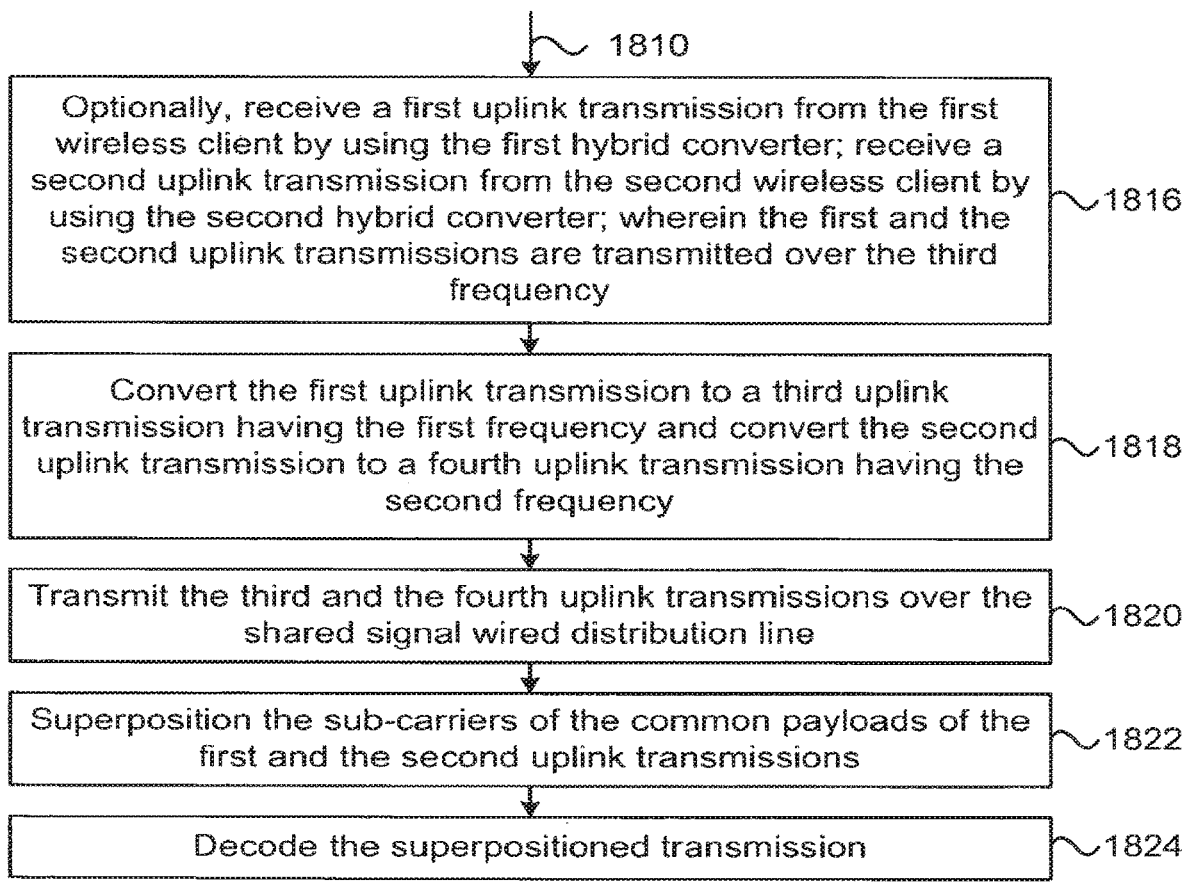

Continuing 1810 in FIG. 18C, the following optional steps are illustrated: In step 1816, receiving a first uplink transmission from the first wireless client by using the first hybrid converter; receiving a second uplink transmission from the second wireless client by using the second hybrid converter; wherein the first and the second uplink transmissions are transmitted over the third frequency; In step 1818, converting the first uplink transmission to a third uplink transmission having the first frequency and converting the second uplink transmission to a fourth uplink transmission having the second frequency; In step 1820, transmitting the third and the fourth uplink transmissions over the shared signal wired distribution line; In step 1822, superimposing the sub-carriers of the common payloads of the first and the second uplink transmissions; And in step 1824, decoding the superpositioned transmission.

Referring again to FIG. 18C, in one embodiment, the superimposing is performed by using a centralized synchronizing communication controller.

Figure 18D:
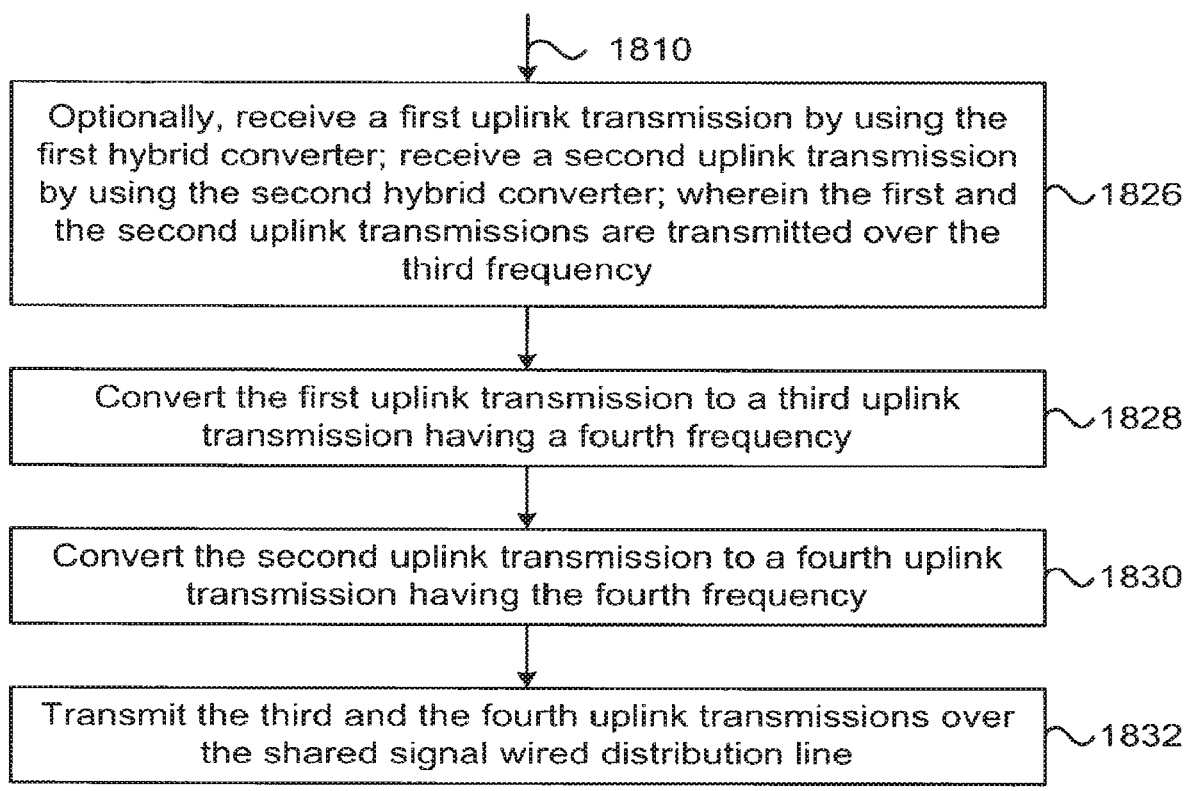

Continuing 1810 in FIG. 18D, the following optional steps are illustrated: In step 1826, receiving a first uplink transmission by using the first hybrid converter; receiving a second uplink transmission by using the second hybrid converter; wherein the first and the second uplink transmissions are transmitted over the third frequency; In steps 1828 and 1830, converting the first uplink transmission to a third uplink transmission having a fourth frequency and converting the second uplink transmission to a fourth uplink transmission having the fourth frequency; And in step 1832, transmitting the third and the fourth uplink transmissions over the shared signal wired distribution line.

Referring again to FIG. 18C, in one embodiment, the fourth frequency is the first frequency or the second frequency. One embodiment further comprises the step of decoding the superpositioned uplink transmission by using a centralized synchronizing communication controller.

Figure 18E:
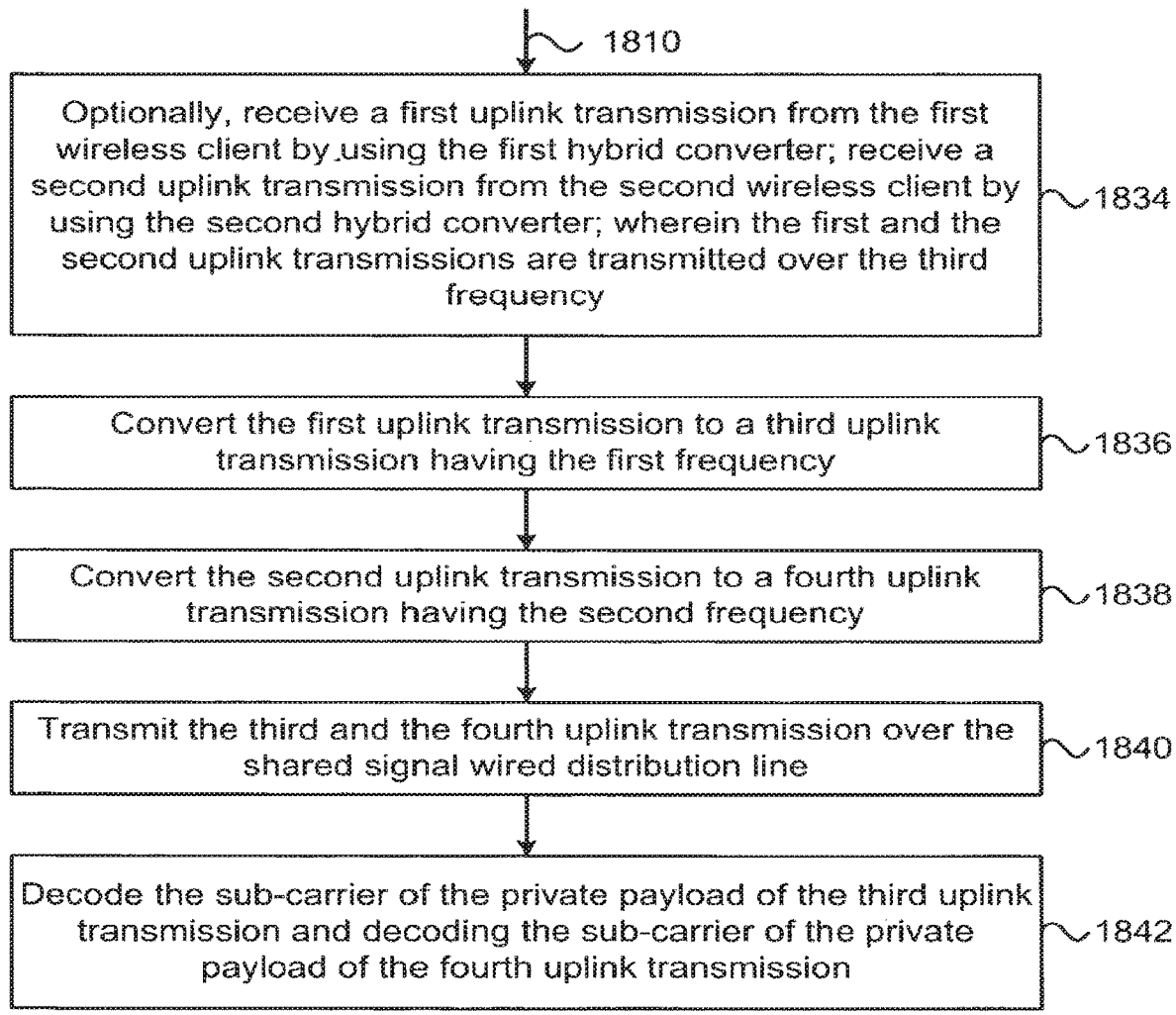

Continuing 1810 in FIG. 18E, the following optional steps are illustrated: In step 1834, receiving a first uplink transmission from the first wireless client by using the first hybrid converter; receiving a second uplink transmission from the second wireless client by using the second hybrid converter; wherein the first and the second uplink transmissions are transmitted over the third frequency and each comprises a private payload; In steps 1836 and 1838, converting the first uplink transmission to a third uplink transmission having the first frequency and converting the second uplink transmission to a fourth uplink transmission having the second frequency; In step 1840, transmitting the third and the fourth uplink transmission over the shared signal wired distribution line; And in step 1842, decoding the sub-carrier of the private payload of the third uplink transmission and decoding the sub-carrier of the private payload of the fourth uplink transmission.

Referring again to FIG. 18C, in one embodiment, the decoding of the sub-carrier of the private payloads is performed by using a centralized synchronizing communication controller.

Thus, it is understood from the embodiments of the invention herein described and illustrated above, that the methods and systems of the present invention are neither anticipated or obviously derived from the prior art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

It is to be understood that the present invention is not limited in its application to the details of the order or sequence of steps of operation or implementation of the disclosed method or to the details of construction, arrangement, and, composition of the corresponding system thereof, set in the description, drawings, or examples of the present invention.

The disclosed embodiments may be implemented with broadband communication standards such as WiFi and WiMAX standards, but it is to be understood that the present invention is highly useful for other communication standards as well.

Citation or identification of any reference in this application shall not be construed as an admission that such reference is available as prior art to the present invention.

While the invention has been described in conjunction with specific embodiments and examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and broad scope of the present invention.

Any element in a claim that does not explicitly state "means for" performing a specific function, or "step for" performing a specific function, is not to be interpreted as a "means" or "step" clause as specified in 35 U.S.C. § 112, ¶ 6.

What is claimed is:

1. A system operative to synchronize wireless transmissions between a base station and a plurality of wireless client devices using a plurality of twisted pairs, comprising:
   the base station located in a first area and comprising a medium access controller (MAC) functionality;
   the plurality of twisted pairs; and
   a plurality of converters located in other areas, in which the plurality of twisted pairs are operative to connect the base station with the plurality of converters, thereby forming a star topology,
   wherein:
      the base station, using the MAC functionality, is configured to determine a transmission plan to be followed by the base station and the plurality of wireless client devices associated with the base station, in which at least a first one of the plurality of wireless client devices is co-located together with a first one of the plurality of converters in a first one of the other areas, and at least a second one of the plurality of wireless client devices is co-located together with a second one of the plurality of converters in a second one of the other areas; and
      the base station is configured to distribute the transmission plan via the plurality of twisted pairs and the plurality of converters to the plurality of wireless client devices, so as to cause the first one of the plurality of wireless client devices to receive the transmission plan via at least a first one of the plurality of twisted pairs connected to the first one of the plurality of converters, and so as to cause the second one of the plurality of wireless client devices to receive the transmission plan via at least a second one of the plurality of twisted pairs connected to the second one of the plurality of converters, thereby synchronizing wireless transmissions to follow between the base station and at least some of the plurality of wireless client devices.

2. The system of claim 1, further comprising a plurality of antennas associated respectively with the plurality of converters;
   wherein as part of a distribution of the transmission plan, the system is configured to:
      wire-transport the transmission plan from the base station via the first one of the plurality of twisted pairs to the first one of the plurality of converters and via the second one of the plurality of twisted pairs to the second one of the plurality of converters;
      wireless-transport the transmission plan from the first one of the plurality of converters via a first one of the plurality of antennas to the first one of the plurality of wireless client devices; and
      wireless-transport the transmission plan from the second one of the plurality of converters via a second one of the plurality of antennas to the second one of the plurality of wireless client devices.

3. The system of claim 2, wherein:
   said wire-transport is done in conjunction with a baseband and/or an intermediary frequency band, and
   said wireless-transport is done in conjunction with a radio-frequency band.

4. The system of claim 3, wherein the plurality of converters are configured to perform a frequency conversion from the baseband and/or the intermediary frequency band to the radio-frequency band.

5. The system of claim 4, wherein said frequency conversion is a frequency up-conversion that does not involve decoding and/or encoding of signals.

6. The system of claim 1, wherein:
   the first area is a first indoor area,
   the first one of the other areas is a second indoor area, and
   the second one of the other areas is a third indoor area in which at least said first one of the plurality of twisted pairs and said second one of the plurality of twisted pairs in conjunction with said star topology are operative to facilitate a distribution of the transmission plan despite the system being distributed across at least three different indoor areas.

7. The system of claim 6, wherein the first one of the plurality of wireless client devices and the second one of the plurality of wireless client devices comprise hidden stations in conjunction with the base station, in which at least said first one of the plurality of twisted pairs and said second one of the plurality of twisted pairs in conjunction with said star topology are operative to facilitate said distribution of the transmission plan, thereby facilitating said synchronizing wireless transmissions to follow between the base station and at least some of the plurality of wireless client devices that are hidden stations.

8. The system of claim 1, wherein as part of said synchronizing wireless transmissions to follow between the base station and at least some of the plurality of wireless client devices, the base station, using the transmission plan transported, is configured to schedule transmission and/or reception slots to at least the first one of the plurality of wireless client devices and the second one of the plurality of wireless client devices.

9. The system of claim 8, wherein the base station is further configured to transmit, according to the transmission plan transported, at a respective first transmission slot, a payload message to the first one of the plurality of wireless client devices, and at a respective second transmission slot, a payload message to the second one of the plurality of wireless client devices.

10. The system of claim 9, wherein:
    the first one of the plurality of wireless client devices is configured to receive, according to the transmission plan transported, at the respective first transmission slot, the payload message to said first one of the plurality of wireless client devices, and
    the second one of the plurality of wireless client devices is configured to receive, according to the transmission plan transported, at the respective second transmission slot, the payload message to said second one of the plurality of wireless client devices.

11. The system of claim 10, wherein:
    said payload message to said first one of the plurality of wireless client devices is received via the first one of the plurality of twisted pairs, and
    said payload message to said second one of the plurality of wireless client devices is received via the second one of the plurality of twisted pairs.

12. The system of claim 8, wherein the base station is further configured to receive, according to the transmission plan transported, at a respective first reception slot, a payload message from the first one of the plurality of wireless client devices, and at a respective second reception slot, a payload message from the second one of the plurality of wireless client devices.

13. The system of claim 12, wherein:
the first one of the plurality of wireless client devices is configured to generate, according to the transmission plan transported, at the respective first reception slot, the respective payload message to the base station, and
the second one of the plurality of wireless client devices is configured to generate, according to the transmission plan transported, at the respective second reception slot, the respective payload message to the base station.

14. The system of claim 13, wherein:
said payload message from said first one of the plurality of wireless client devices is received at the base station via the first one of the plurality of twisted pairs, and
said payload message from said second one of the plurality of wireless client devices is received in the base station via the second one of the plurality of twisted pairs.

15. The system of claim 8, wherein said transmission and/or reception slots are associated with (i) time slots in a transmission frame and/or (ii) frequency slots in the transmission frame.

16. The system of claim 15, wherein the transmissions are of orthogonal frequency division multiple access (OFDMA) type, in which each of the frequency slots is a sub-set of sub-carriers of an OFDMA transmission frame.

17. A system operative to synchronize wireless transmissions between a base station and a plurality of wireless client devices using a plurality of twisted pairs, comprising:
the base station located in a first area, the base station configured to generate a transmission plan operative to identify upcoming transmission slots to be used by at least first and second wireless client devices;
a first twisted pair and a second twisted pair, in which the base station is further configured to wire-transport the transmission plan, via the first twisted pair to a first converter located in a first remote area, and via the second twisted pair to a second converter located in a second remote area;
wherein the system is configured to: wireless-transport the transmission plan, by the first converter to at least the first wireless client device located in the first remote area, and wireless-transport the transmission plan, by the second converter to at least the second wireless client device located in the second remote area;
thereby distributing the transmission plan to at least the first and second wireless client devices, and consequently synchronizing wireless transmissions to follow between the base station and at least the first and second wireless client devices.

18. The system of claim 17, wherein the system is further configured to:
wire-transport, according to the transmission plan, by the base station, a first payload intended for the first wireless client device, via the first twisted pair, to the first converter;
wireless-transport said first payload, by the first converter, to at least the first wireless client device;
wire-transport, according to the transmission plan, by the base station, a second payload intended for the second wireless client device, via the second twisted pair, to the second converter; and
wireless-transport said second payload, by the second converter, to at least the second wireless client device.

19. The system of claim 17, wherein the system is further configured to:
wireless-transport, according to the transmission plan, to the base station, a first payload from the first wireless client device to the first converter;
wire-transport said first payload, by the first converter, to the base station via the first twisted pair;
wireless-transport, according to the transmission plan, to the base station, a second payload from the second wireless client device to the second converter; and
wire-transport said second payload, by the second converter, to the base station via the second twisted pair.

20. The system of claim 17, wherein:
said base station is a point-to-multipoint wireless base station, in which the first and second wireless client devices are at least some of the multipoints, and
said transmission plan is associated with a point-to-multipoint scheduling functionality of the base station, in which the base station functions as a wireless point-to-multipoint centralized synchronizing communication controller.

* * * * *